Figure 1:
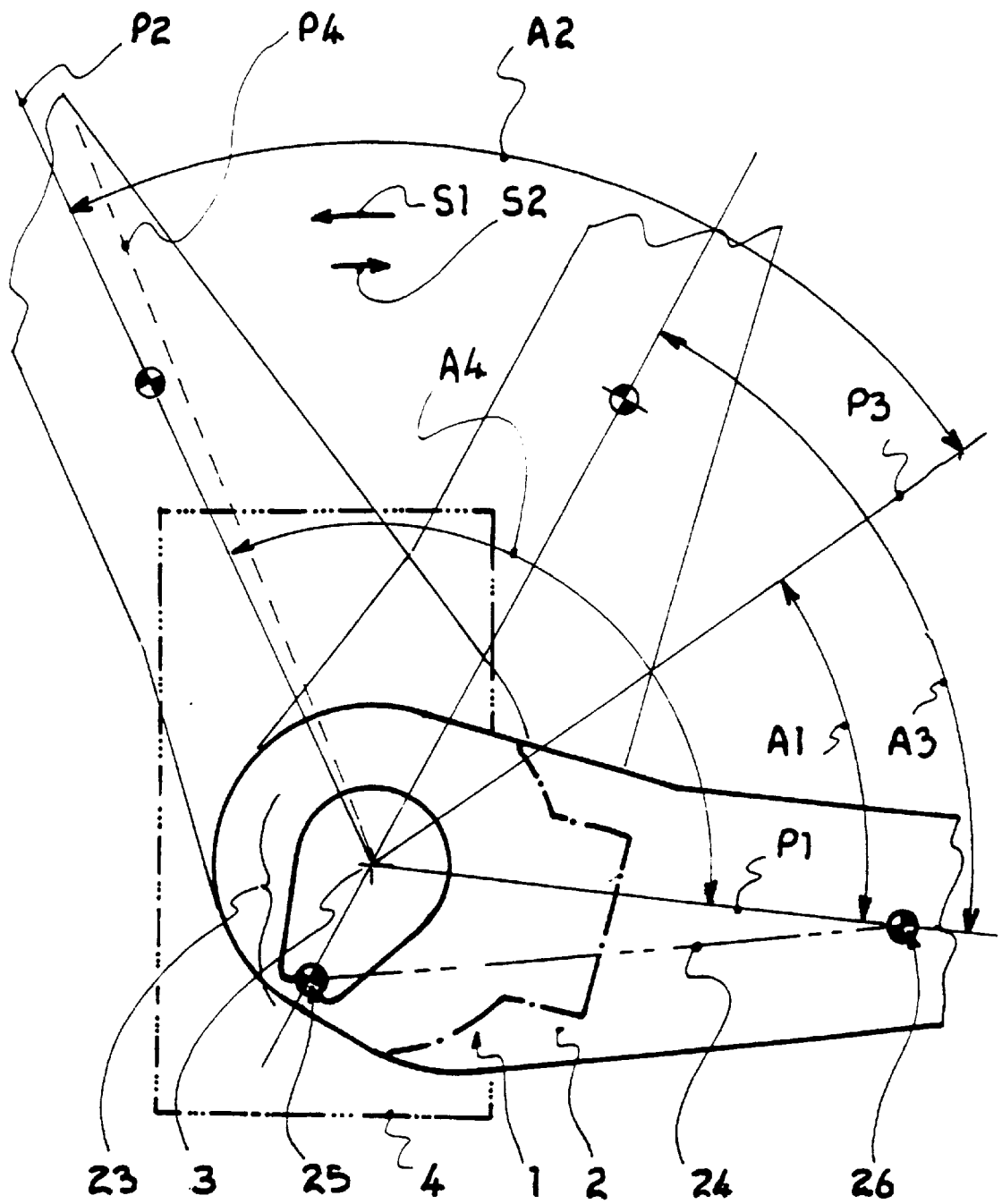
Figure 3:
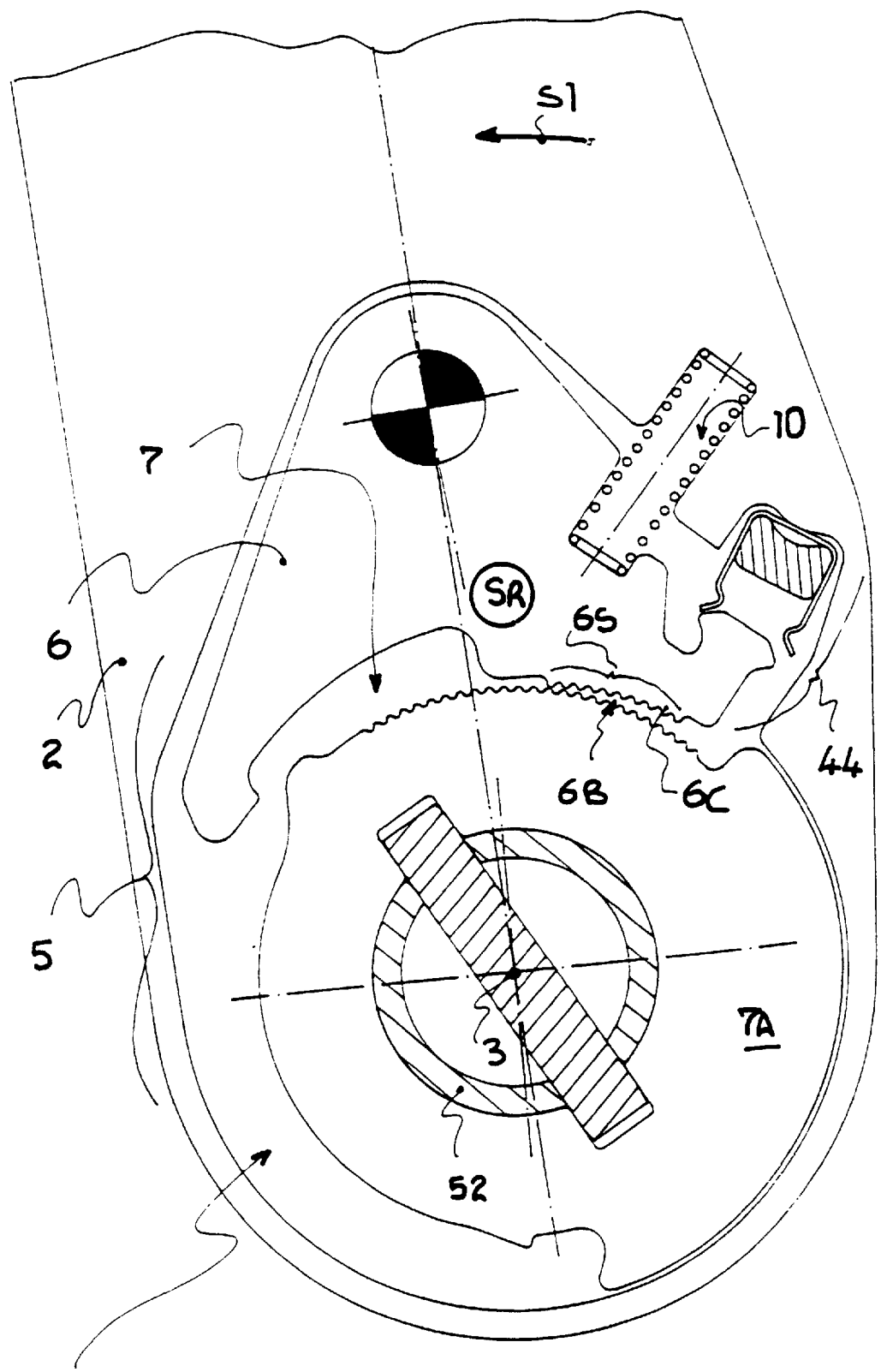
Figure 4:
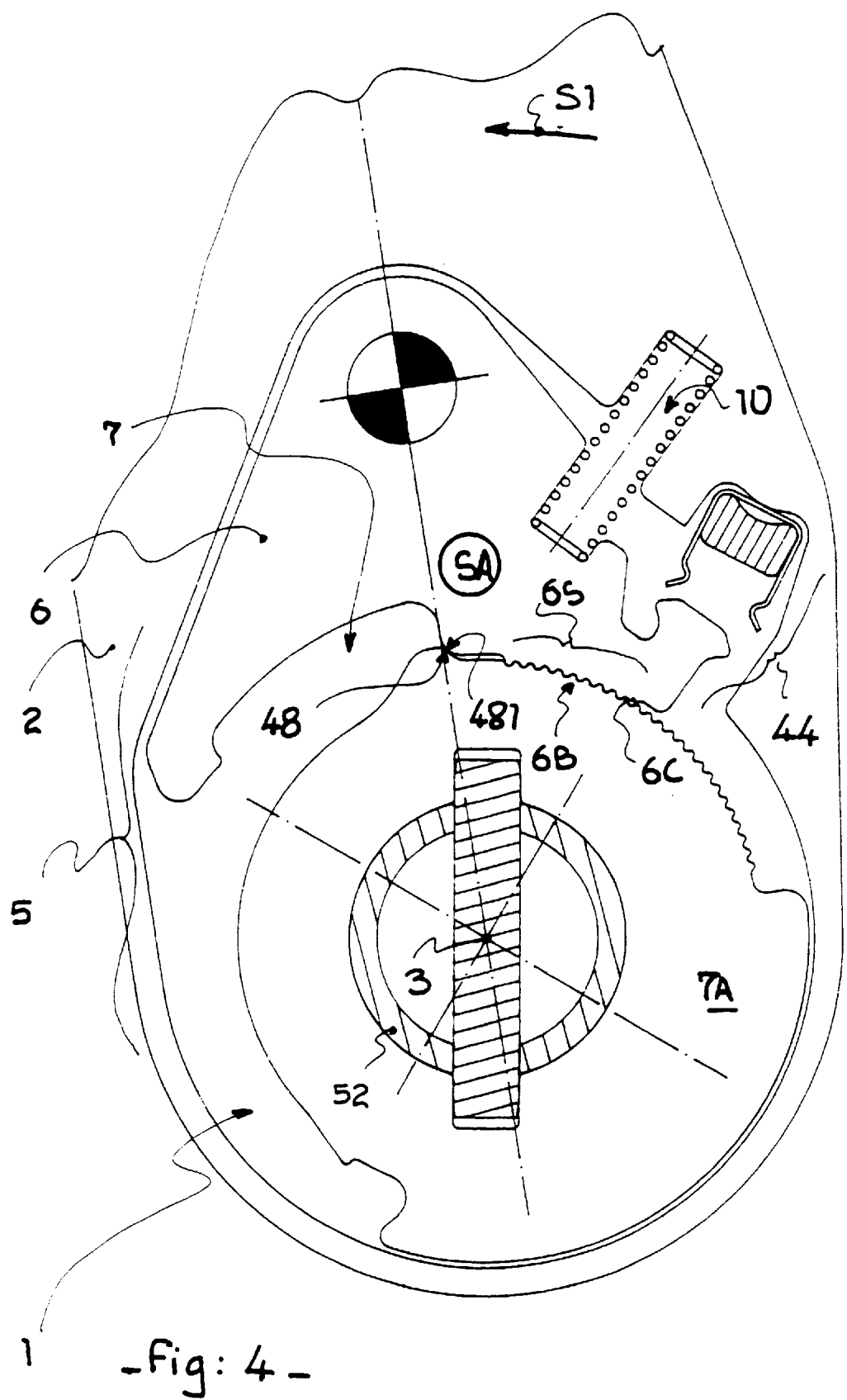
Figure 6:
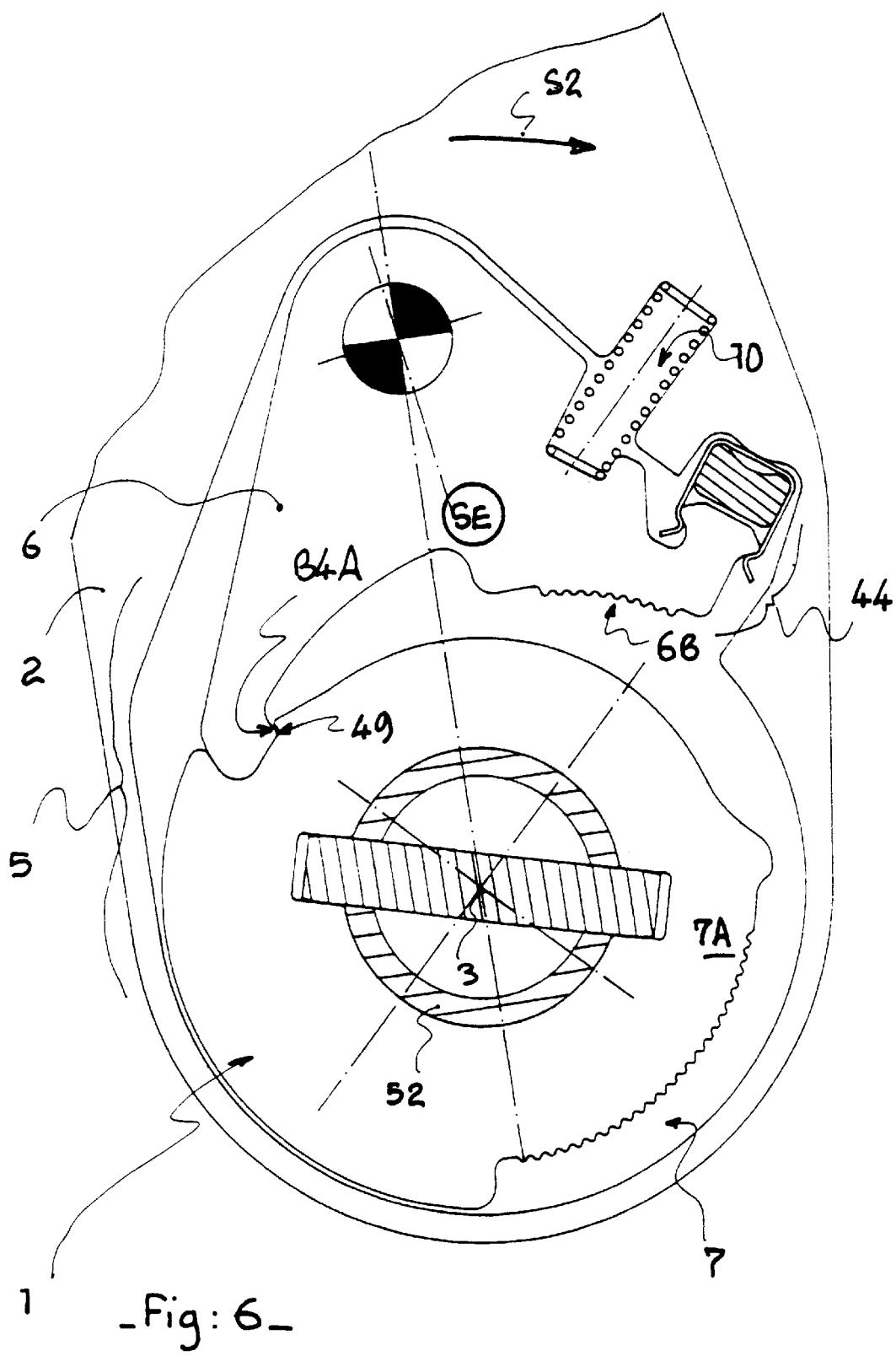
Figure 7:
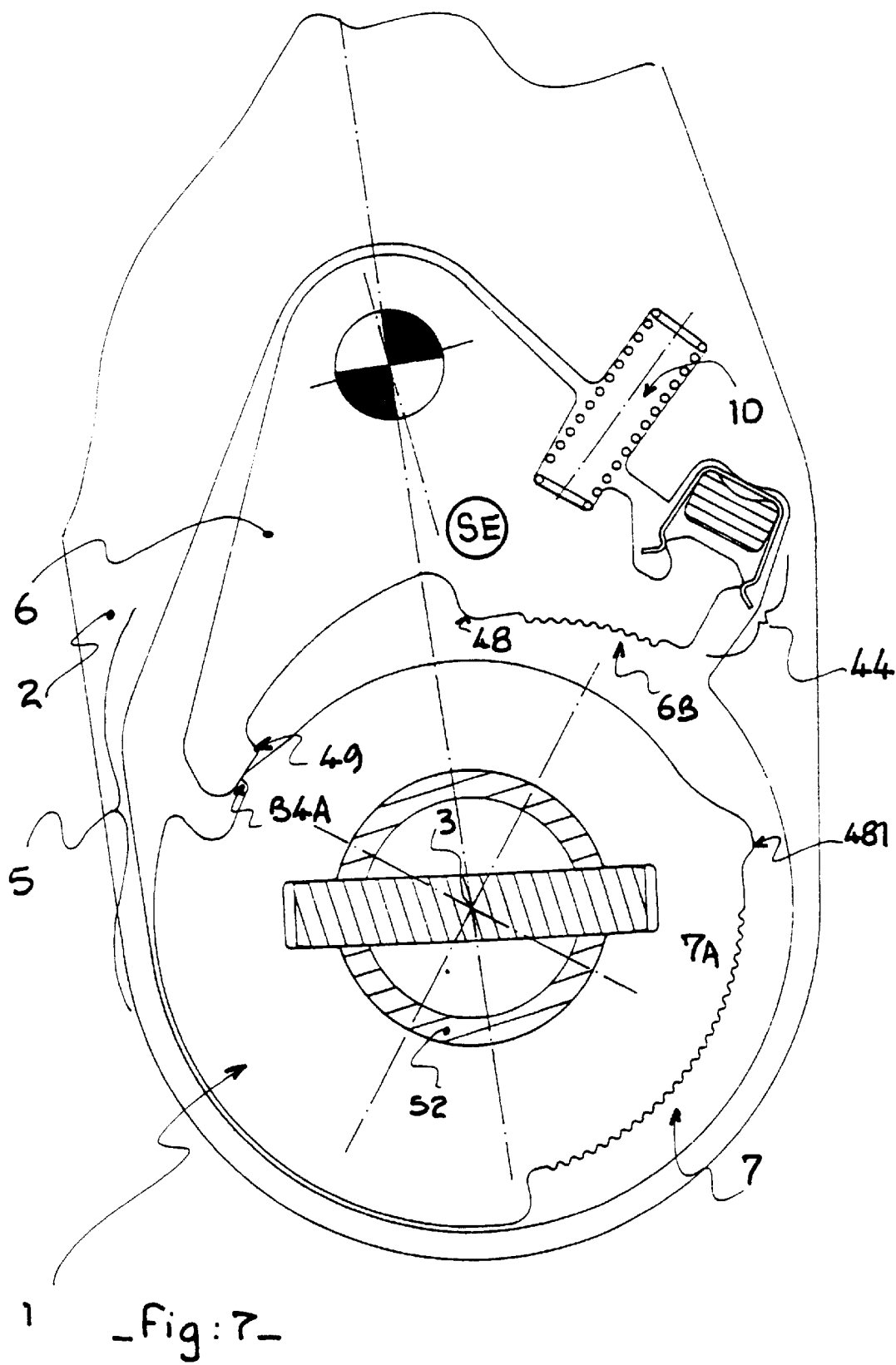
Figure 8:
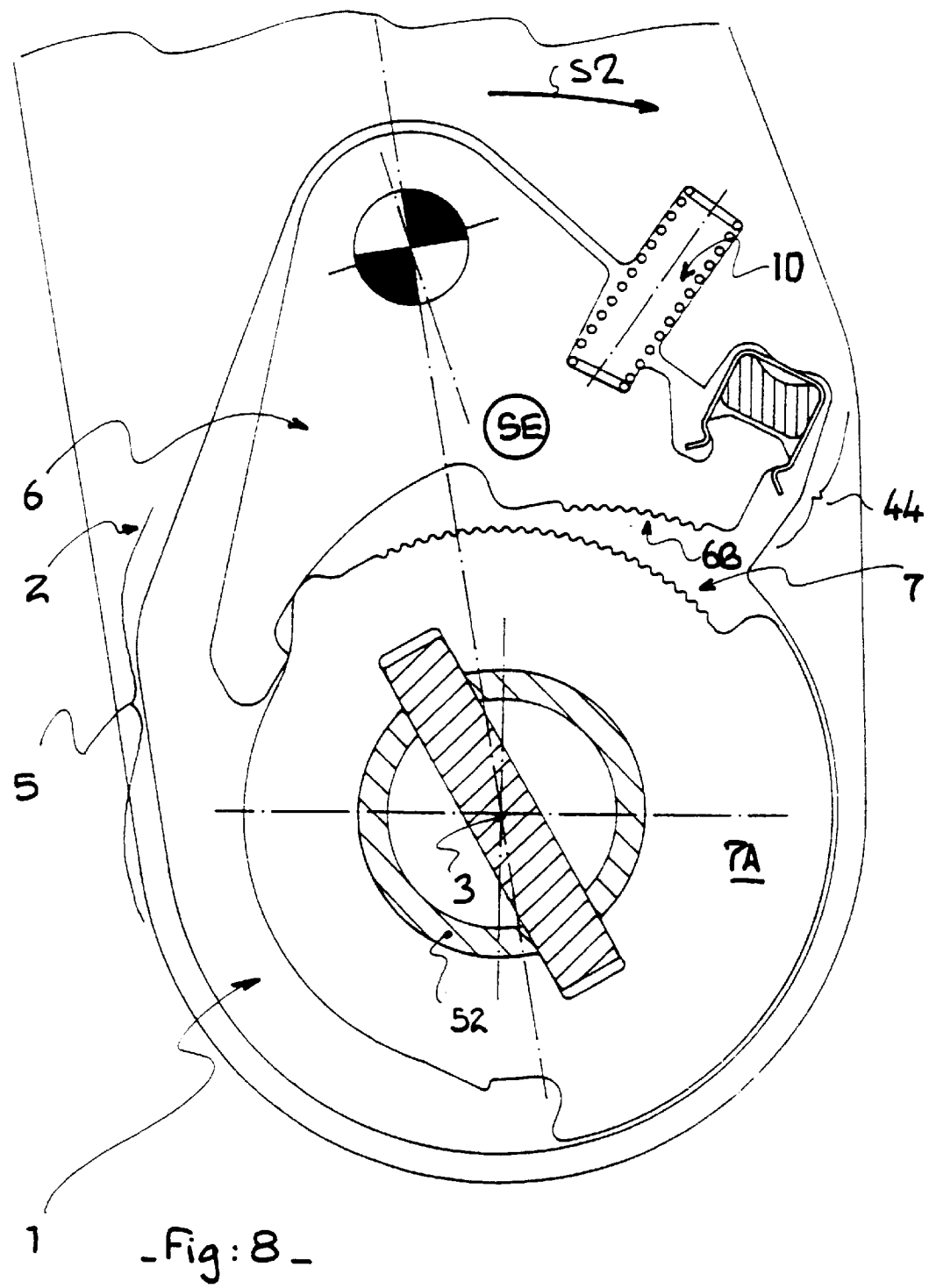
Figure 10:
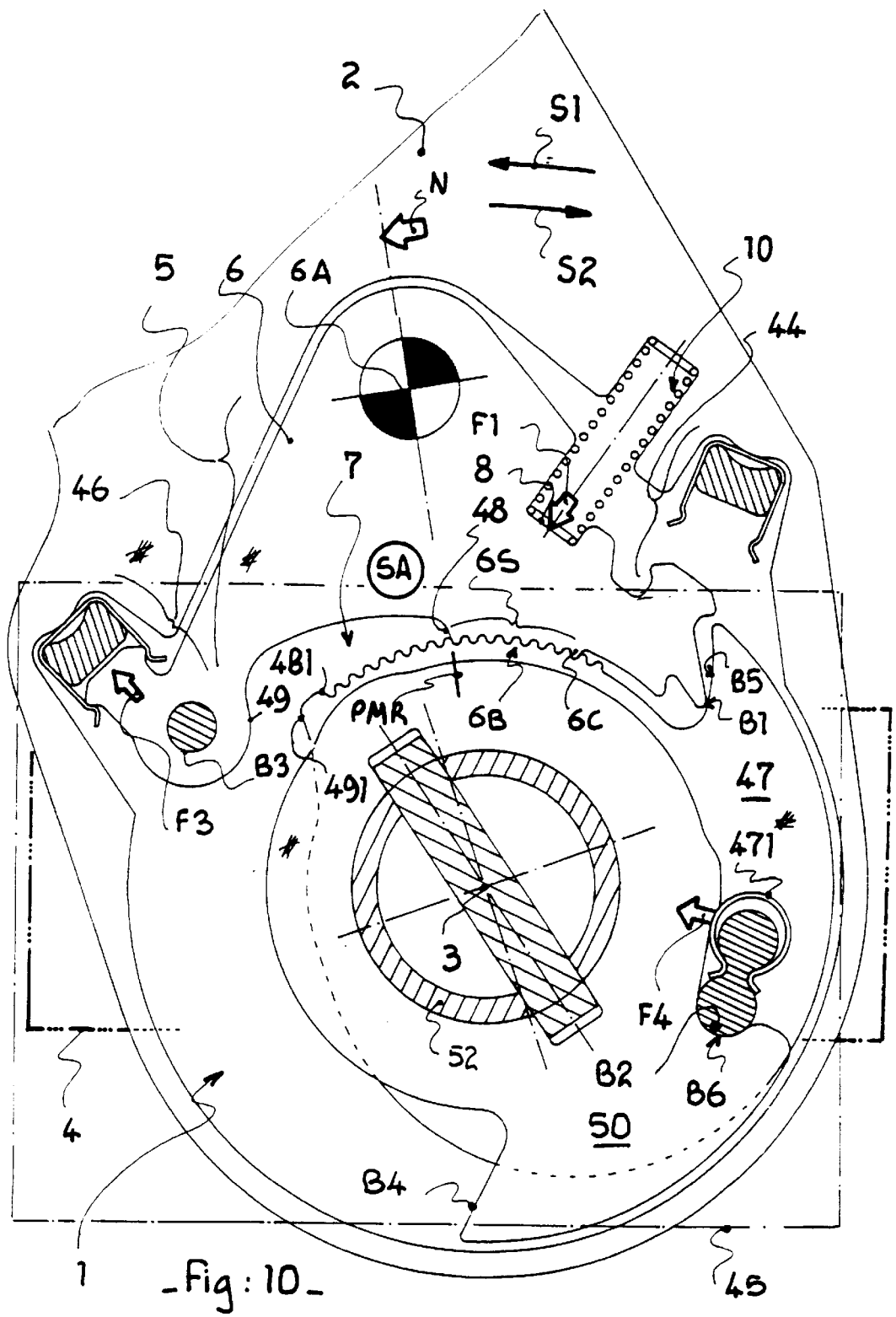
Figure 11:
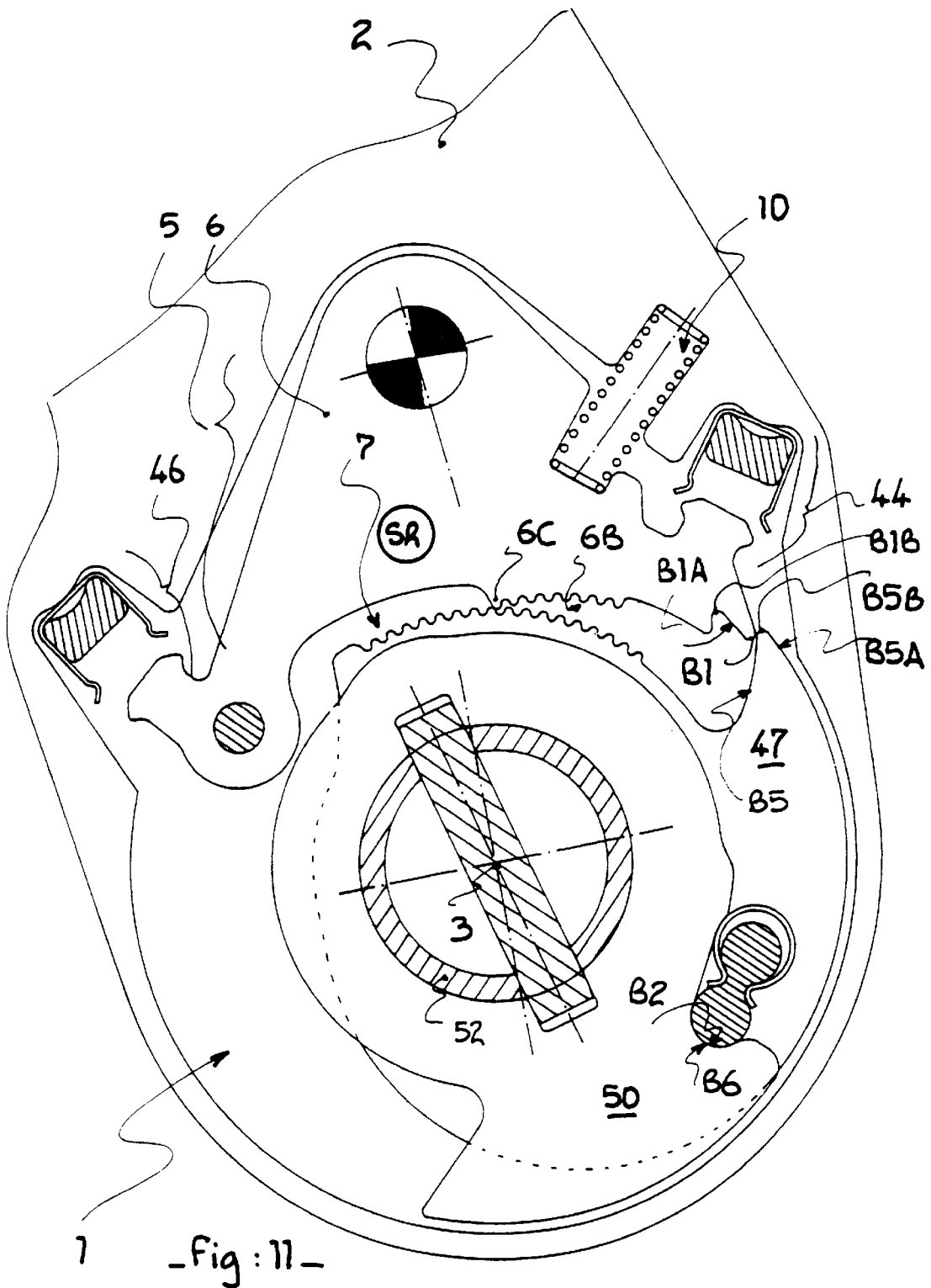
Figure 12:
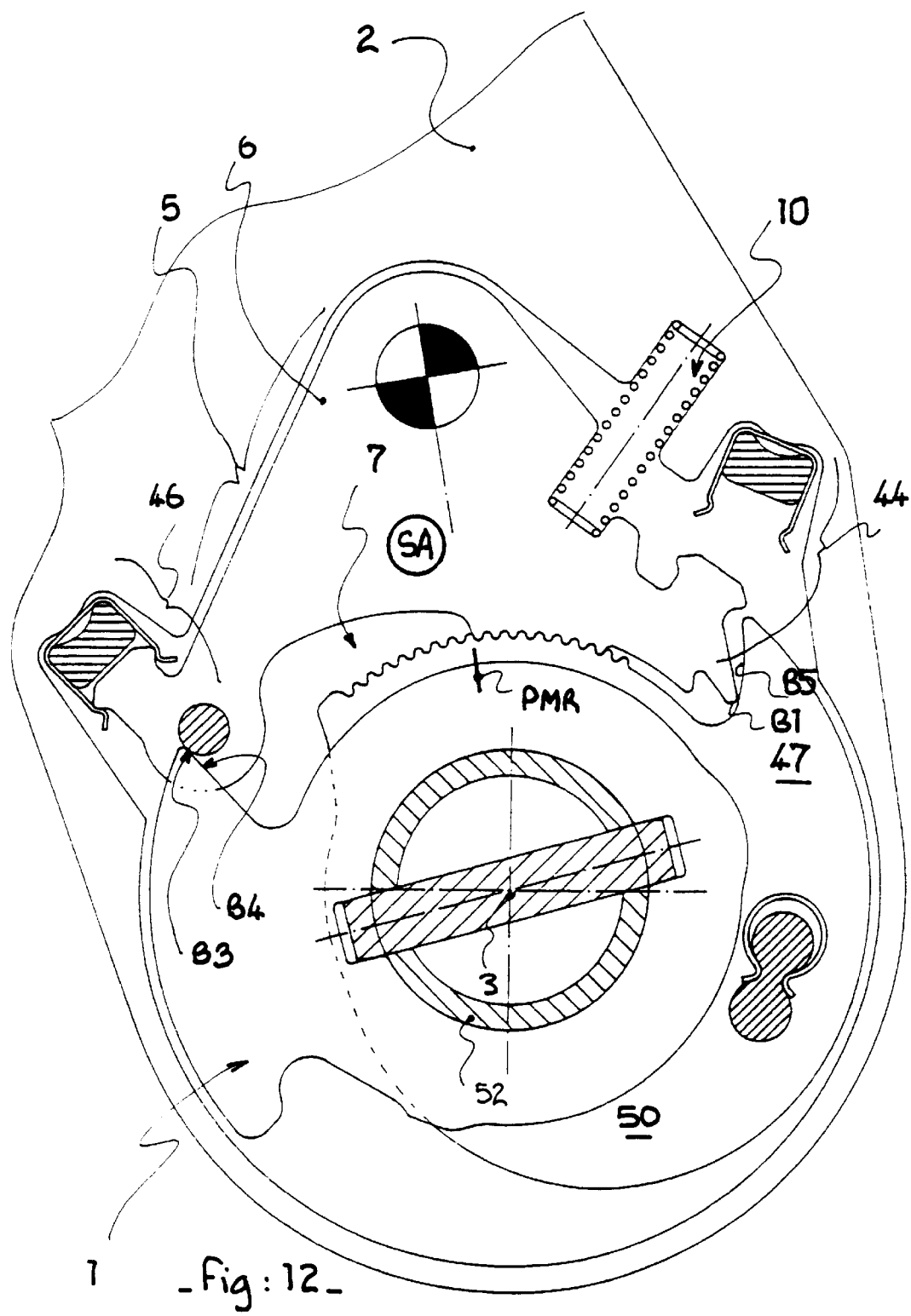
Figure 13:
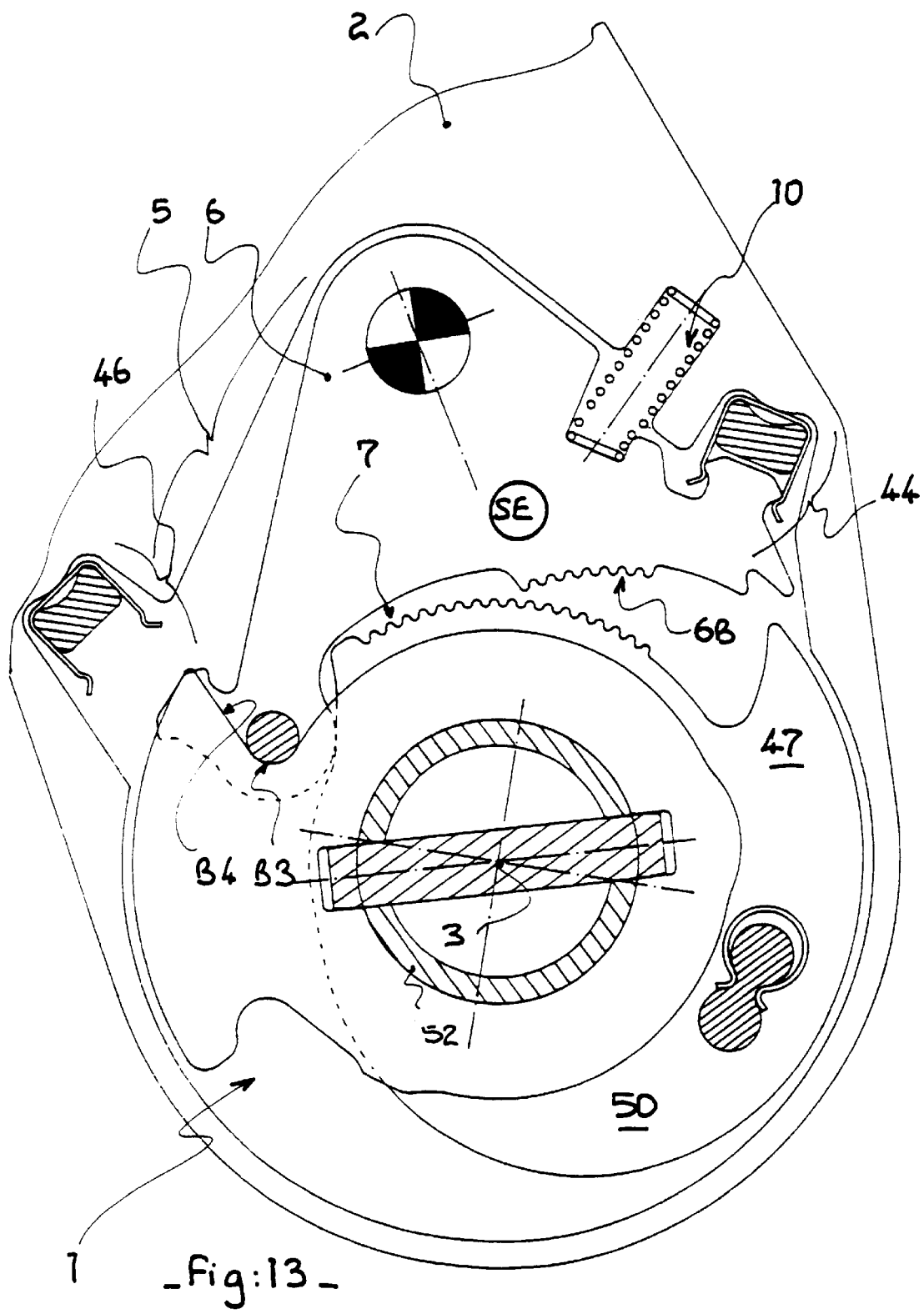
Figure 14:
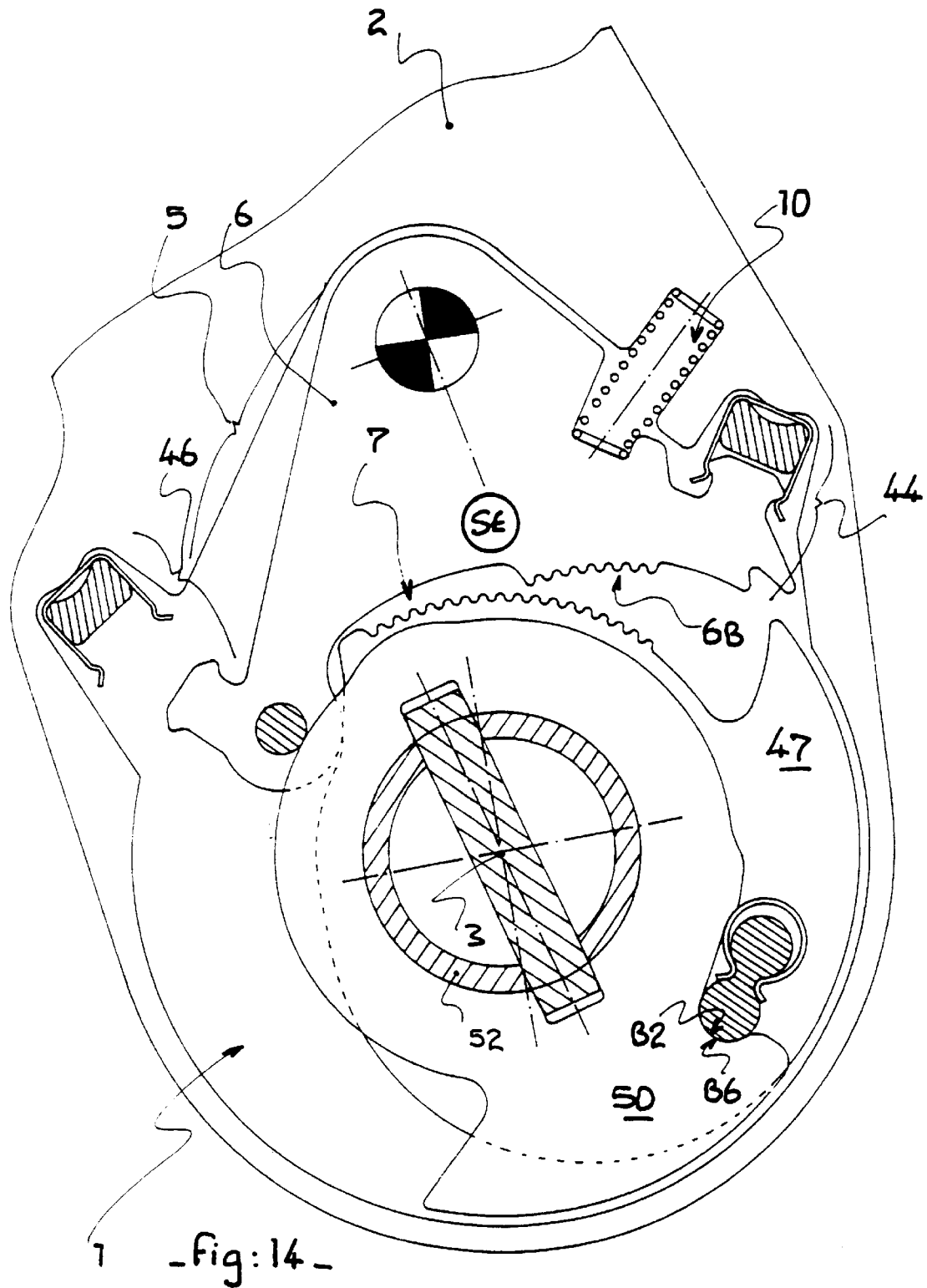
Figure 15:
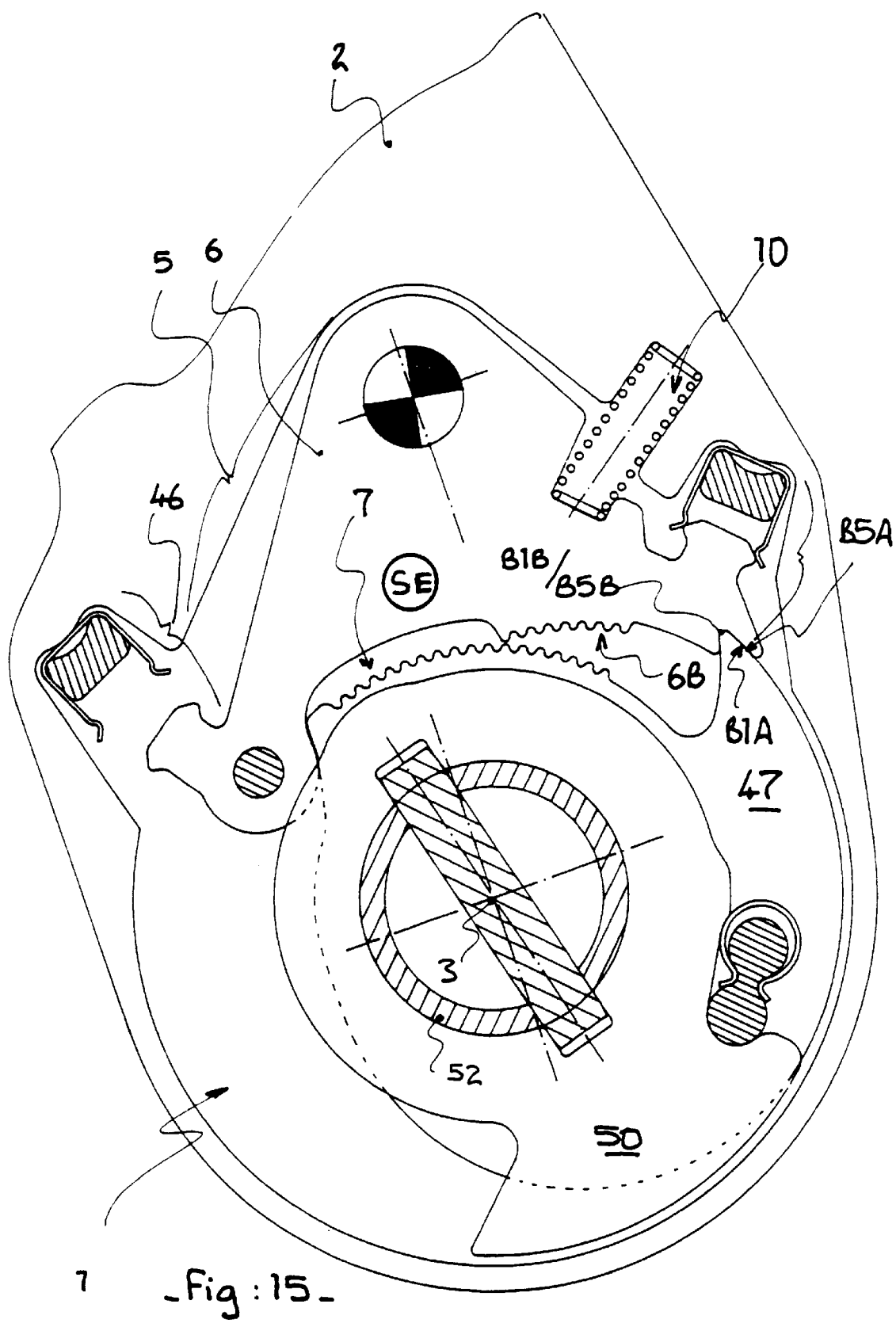

United States Patent [19]
Lefevere

[11] Patent Number: 6,106,068
[45] Date of Patent: Aug. 22, 2000

[54] AUTOMATIC DEVICE FOR INDEX GUIDING A MOVABLE PART PIVOTABLY MOUNTED ABOUT AN AXIS ON A PART CONSIDERED TO BE STATIONARY RELATIVE TO SAID AXIS

[75] Inventor: Marc Lefevere, Croix, France

[73] Assignees: Robert Ecrepont; Cabinet Ecrepont, both of Lille, France

[21] Appl. No.: 09/000,027

[22] PCT Filed: Jul. 19, 1996

[86] PCT No.: PCT/FR96/01140

§ 371 Date: Apr. 29, 1998

§ 102(e) Date: Apr. 29, 1998

[87] PCT Pub. No.: WO97/05396

PCT Pub. Date: Feb. 13, 1997

[30] Foreign Application Priority Data

Jul. 25, 1995 [FR] France .................................... 95/09267

[51] Int. Cl.[7] ........................................................ B60N 2/02
[52] U.S. Cl. ........................................ 297/367; 297/354.12
[58] Field of Search ........................... 297/354.12, 361.1, 297/366, 367, 368, 369

[56] References Cited

U.S. PATENT DOCUMENTS

| | | | |
|---|---|---|---|
| 4,103,970 | 8/1978 | Homier | 297/367 X |
| 4,188,064 | 2/1980 | Cheshire | 297/367 |
| 4,684,174 | 8/1987 | Bell | 297/367 |
| 5,664,836 | 9/1997 | Takagi | 297/369 X |
| 5,785,386 | 7/1998 | Yoshida | 297/367 |

FOREIGN PATENT DOCUMENTS

| | | |
|---|---|---|
| 0505593 | 9/1992 | European Pat. Off. . |
| 2704661 | 11/1994 | France . |
| 3611929 | 10/1987 | Germany . |
| 9105323 | 8/1991 | Germany . |
| 1567579 | 5/1980 | United Kingdom . |

Primary Examiner—Milton Nelson, Jr.
Attorney, Agent, or Firm—Miles & Stockbridge; Dennis P. Clarke

[57] ABSTRACT

An automatic device (1) for index guiding a part (2) pivotably mounted about an axis (3) on a part (4) that is stationary relative to the axis (3). The device uses a mechanism (5) provided with a ratchet (6) that is pivotable between a number of positions including a fully engaged position, an adjustment position, and a fully spaced position. A toothed surface (6B) of the ratchet (6) is formed in an angular sector (6S) which, in the fully engaged position, is centered on the rotational axis (3) of the movable part and does not include a pivot axis (6A) of the ratchet (6).

16 Claims, 20 Drawing Sheets

Fig: 1

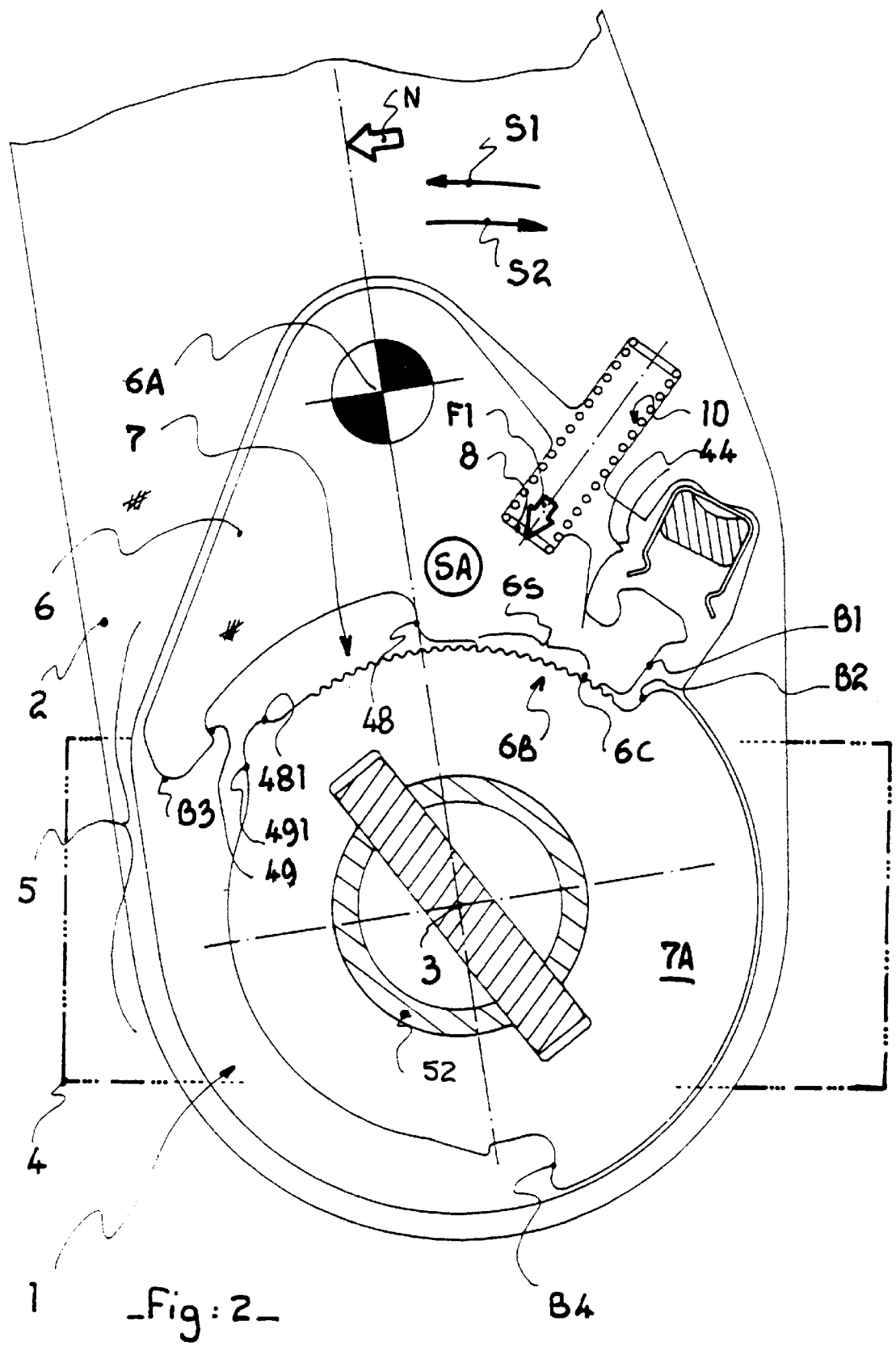
_Fig. 2_

Fig: 4

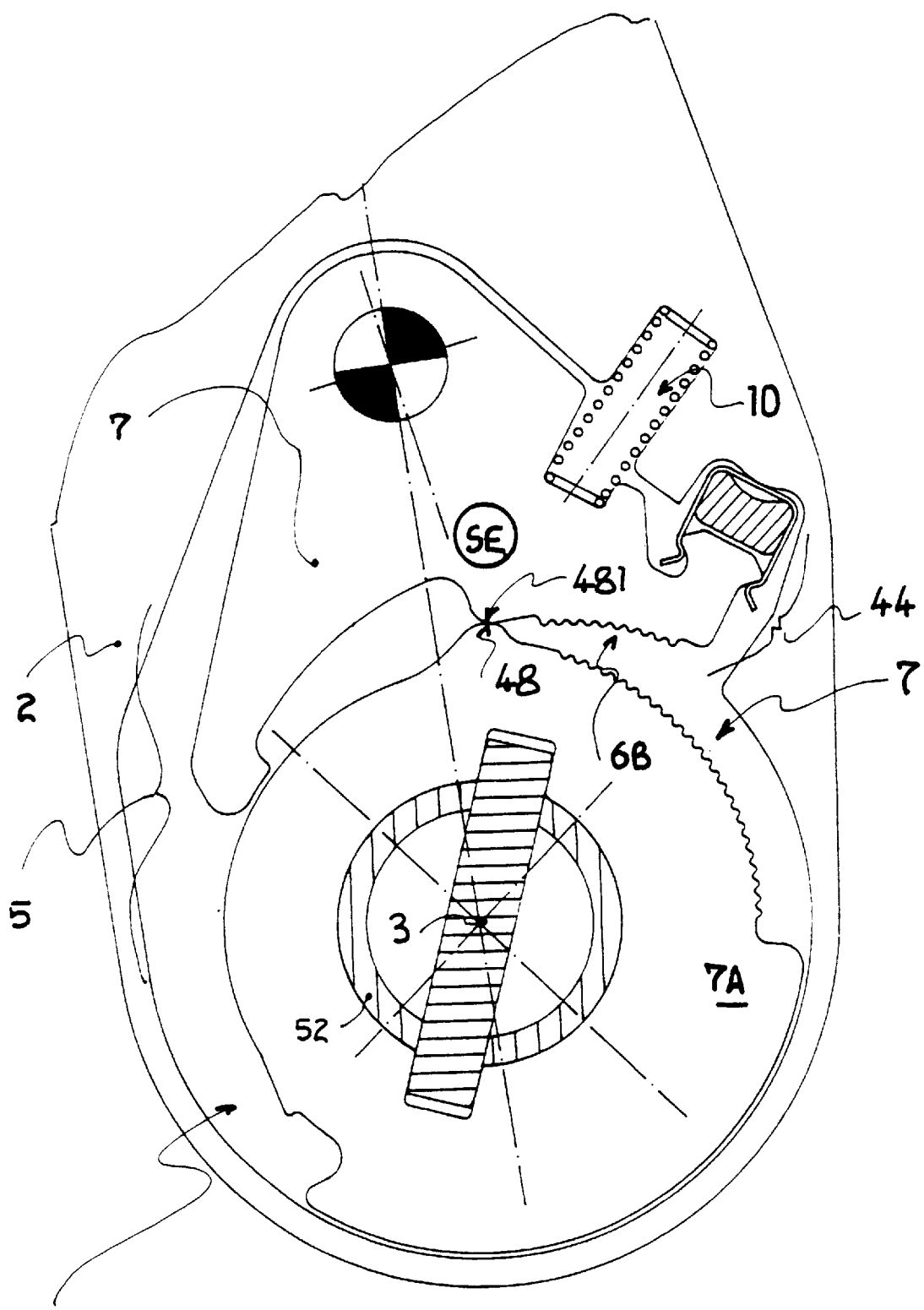
_Fig. 5_

Fig: 6

_Fig:7_

_Fig: 8_

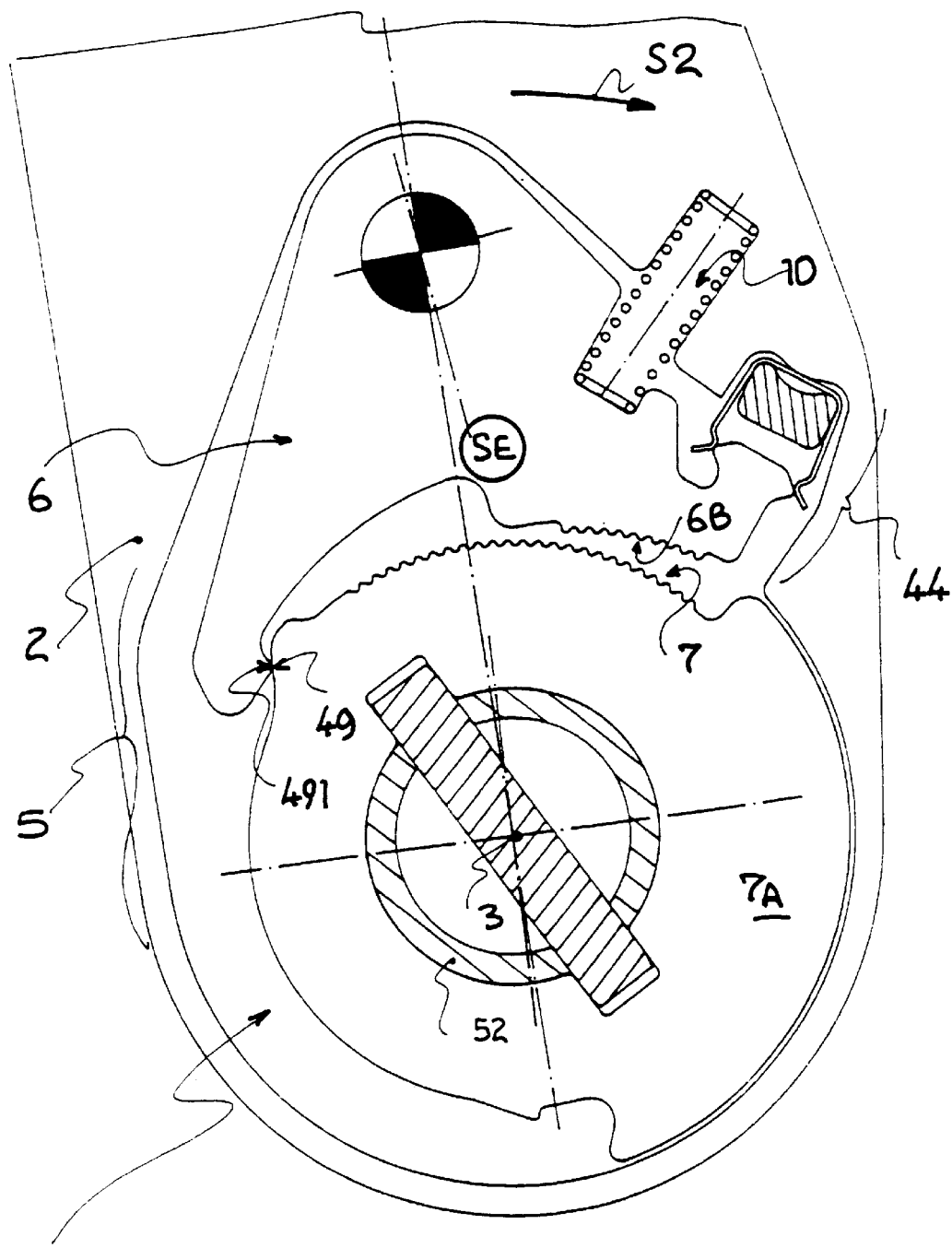
_Fig. 9_

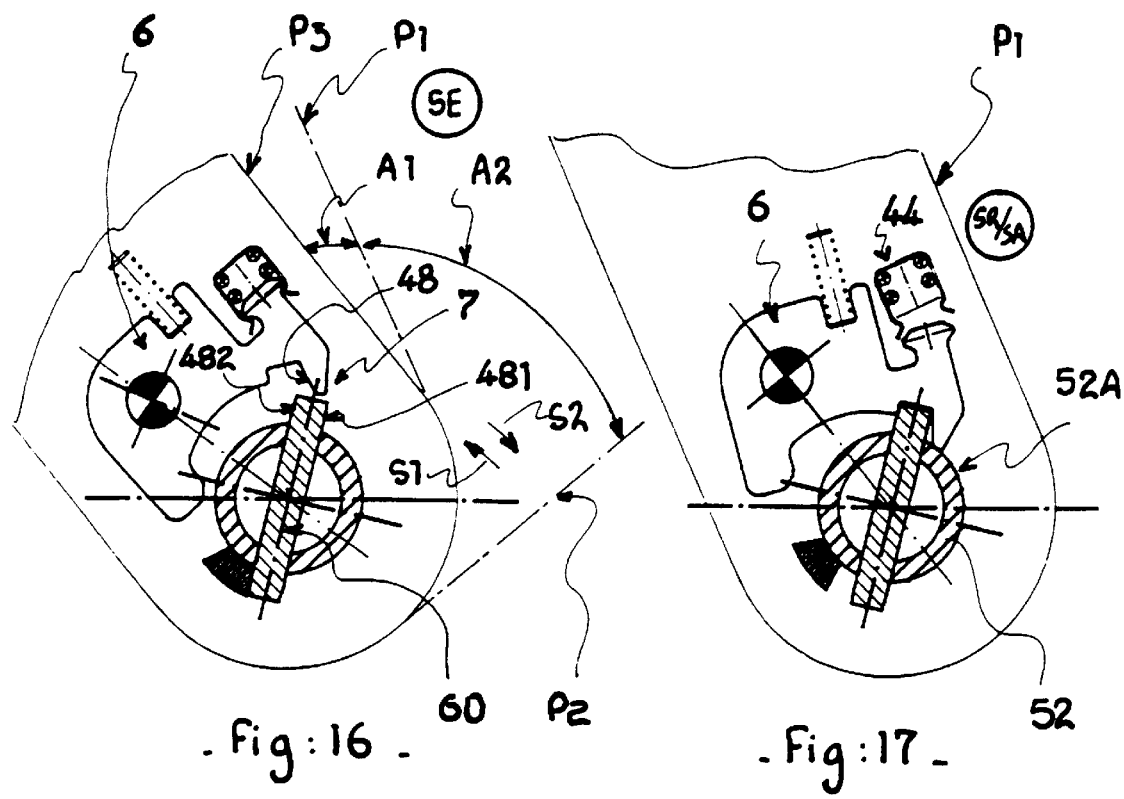
Fig: 16    Fig: 17
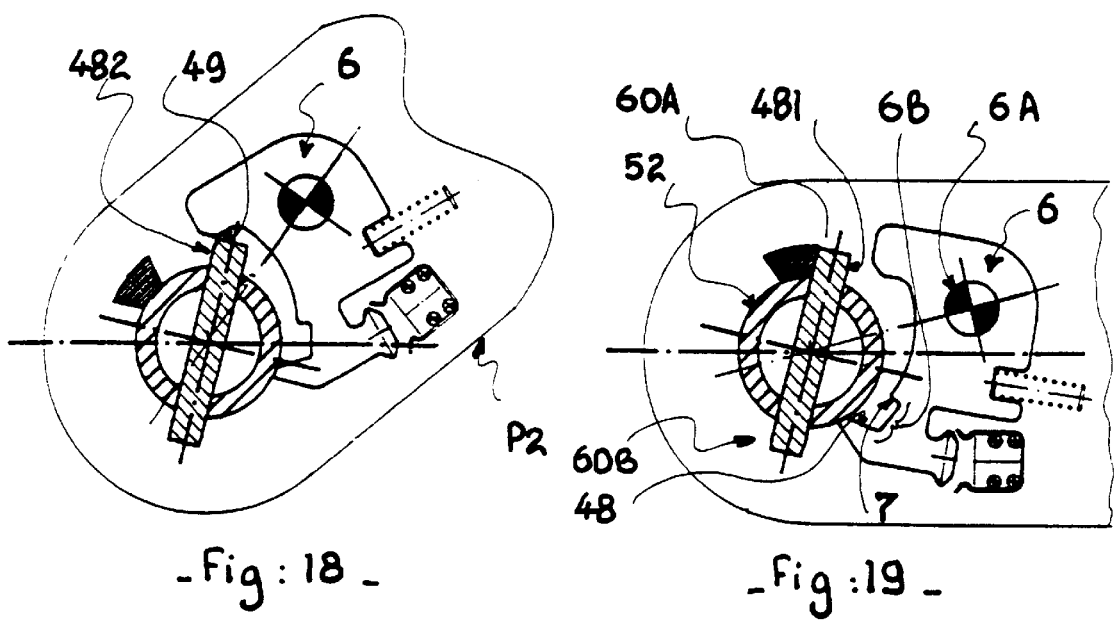
Fig: 18    Fig: 19

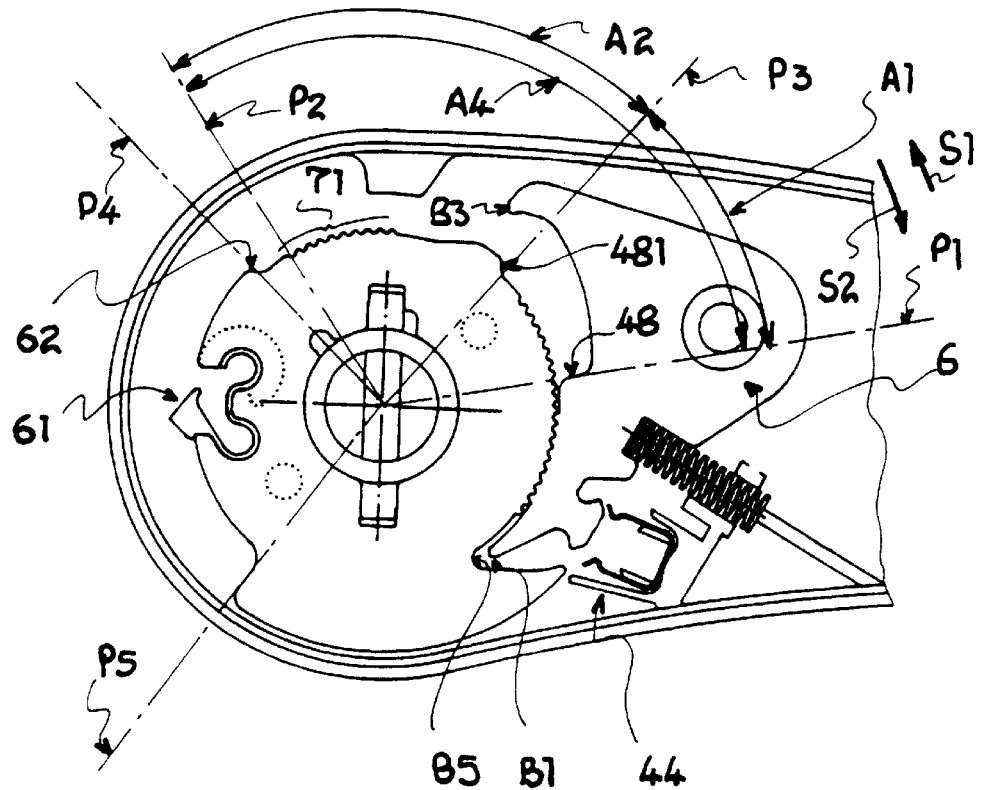
_Fig: 20_
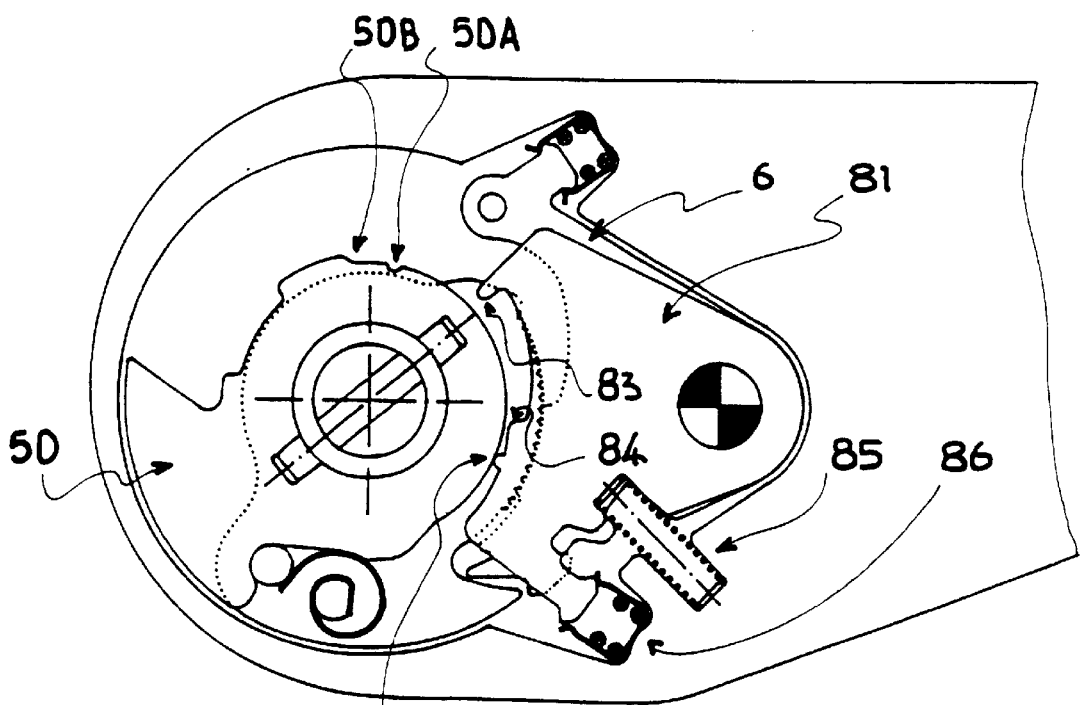
_Fig: 21_

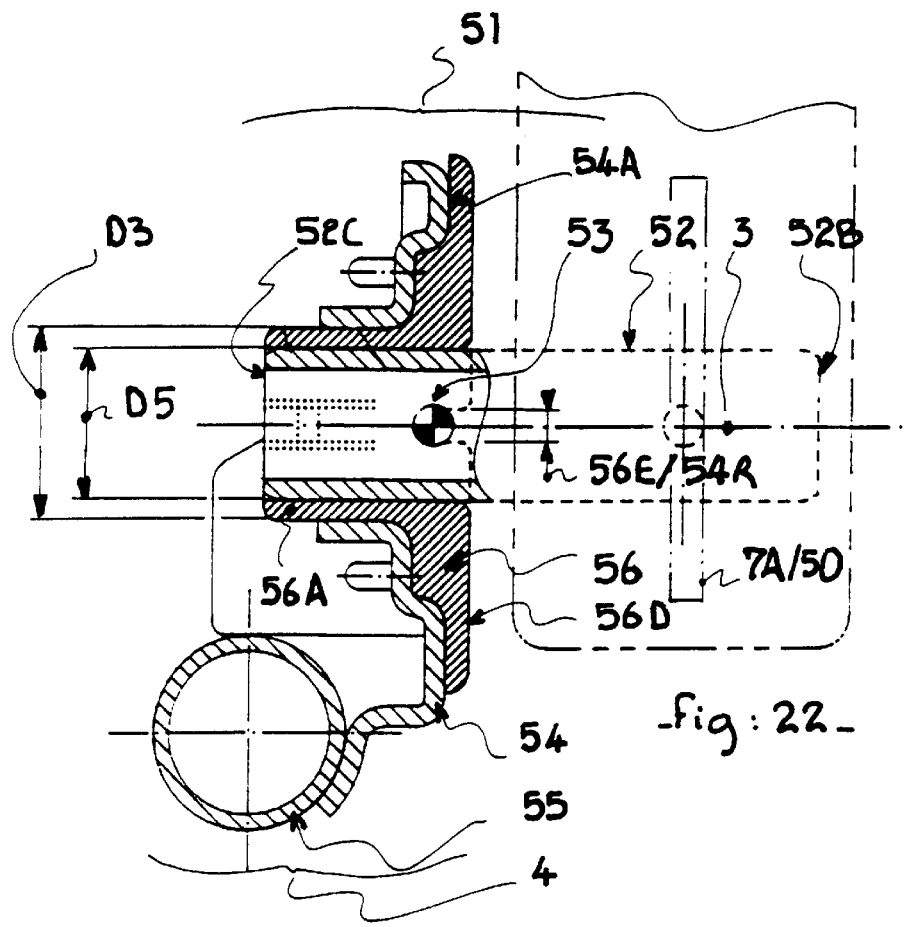
_fig: 22_
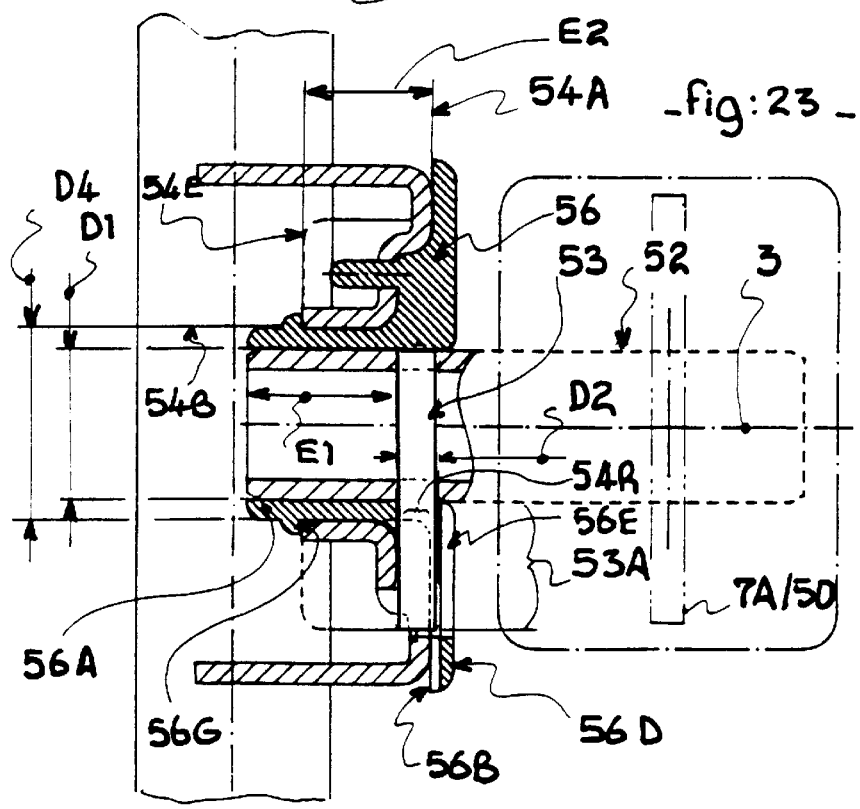
_fig: 23_

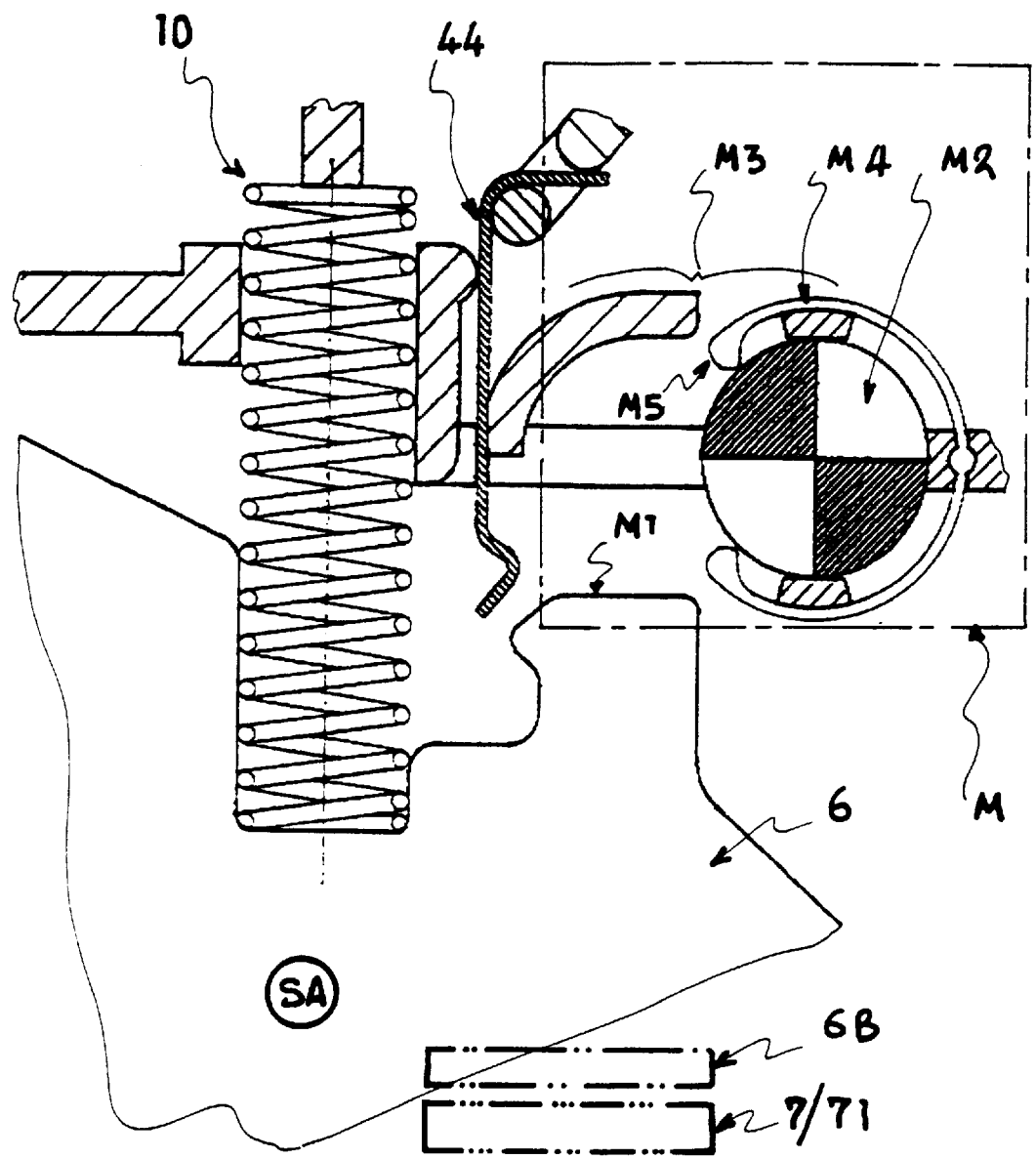
_Fig: 26_

AUTOMATIC DEVICE FOR INDEX GUIDING A MOVABLE PART PIVOTABLY MOUNTED ABOUT AN AXIS ON A PART CONSIDERED TO BE STATIONARY RELATIVE TO SAID AXIS

The invention relates to an automatic device for index guiding a movable part pivotably mounted about an axis on a part considered to be stationary relative to this axis.

The invention relates more particularly, though not exclusively, to automatic devices for index guiding arm rests for seats such as vehicle seats, for example in automobiles.

In effect, on certain vehicle seats in particular, the arm rests must be able, in the position in which they are used by a person, to have their angular position precisely adjusted relative to a generally horizontal reference plane, and if necessary, to be retracted into a radically different position located substantially in the plane of the seat back that they equip.

The invention specifically relates to an automatic device for index guiding a movable part between at least two distinct angular positions delimiting at least two angular sectors, including a primary sector in which this same part, at least in a first direction of displacement toward one of the angular limits of this primary sector, can be displaced at least by an angular fraction of this sector, but without the capability to return directly in a second, opposite direction to any previously abandoned incremented position, due to its displacement in the first direction, and a secondary sector within which this movable part can be displaced freely.

Index guiding devices of the above-mentioned type exist, but they are not automatic, i.e., they include a manual control mechanism.

One object of the invention is to obtain an index guiding device of the above-mentioned type which is entirely automatic and which combines this characteristic with the reliability and durability of some of the non-automatic devices known in the prior art.

To this end, the invention relates to an automatic index guiding device that uses a rachet mechanism, that is, a mechanism essentially comprising a notched ramp in the form of a cylindrical case which is carried at least indirectly by one of the pivoting parts, and a ratchet that cooperates with the ramp and is itself carried by the other pivoting part.

The invention is particularly characterized in that:

it uses a pivoting ratchet mechanism, which means that in order to cooperate with the notched ramp, it comprises a part pivotably mounted about an axis substantially parallel to the rotational axis of the stationary and movable parts between a number of positions, including at least:

a so-called fully engaged position against the notched ramp, that is, a position in which the ratchet has a toothed surface pressed tightly against the ramp, an adjustment position, that is, a position in which the ratchet has pivoted on its axis and has only one remaining tooth of its toothed surface in contact with the ramp, a fully spaced position, that is, a position in which the ratchet has pivoted on its axis past the adjustment position, and no longer has any of the teeth of its toothed surface in contact with the ramp, the toothed surface of the ratchet is formed in an angular sector which, in the so-called fully engaged position of this surface against the notched ramp, is centered on the rotational axis of the movable part and does not include the pivot axis of the ratchet, and is disposed relative to an imaginary line passing through the rotational axis and the pivot axis in such a way that, when the movable part is stressed in the first direction of displacement and the ratchet is substantially in its fully engaged position against the ramp, it tends to disengage from the latter and to assume its adjustment position, and when the movable part is stressed in the second direction of displacement and the ratchet is in the adjustment position, it tends to disengage from the latter and to assume its fully engaged position against the ramp.

Figure 24:
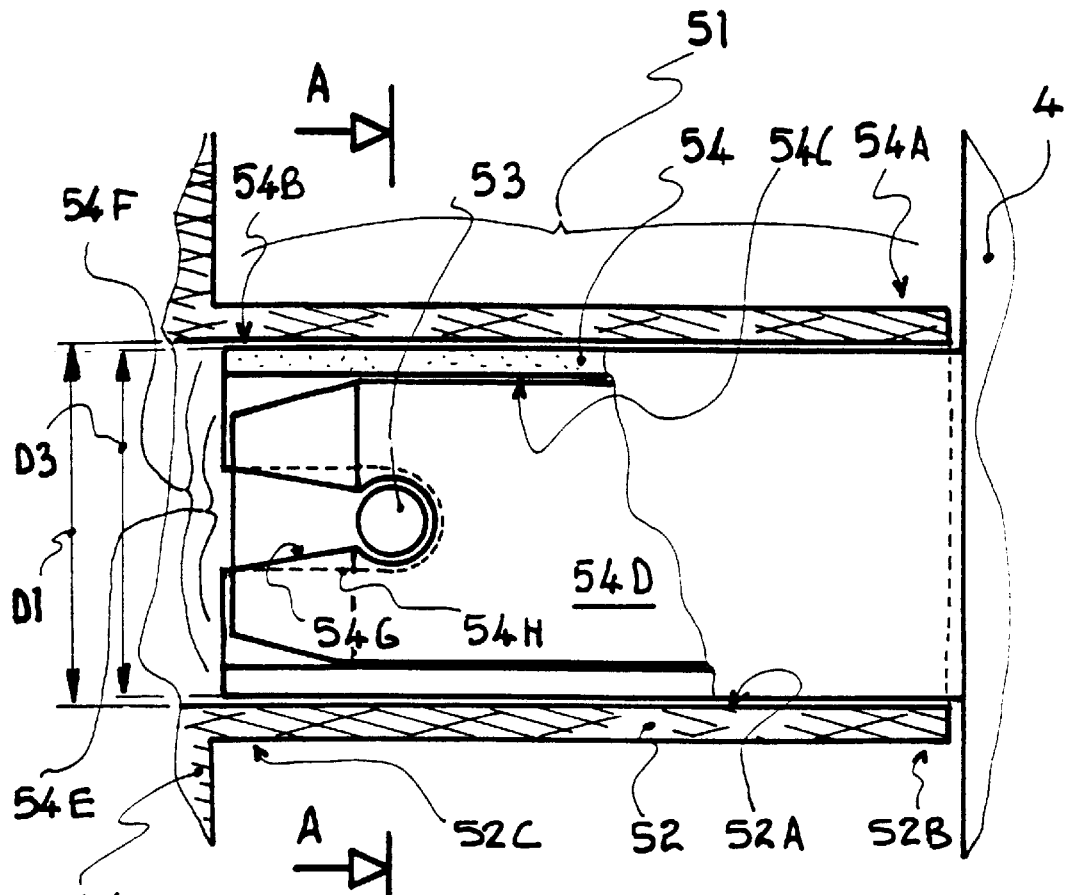
Figure 25:
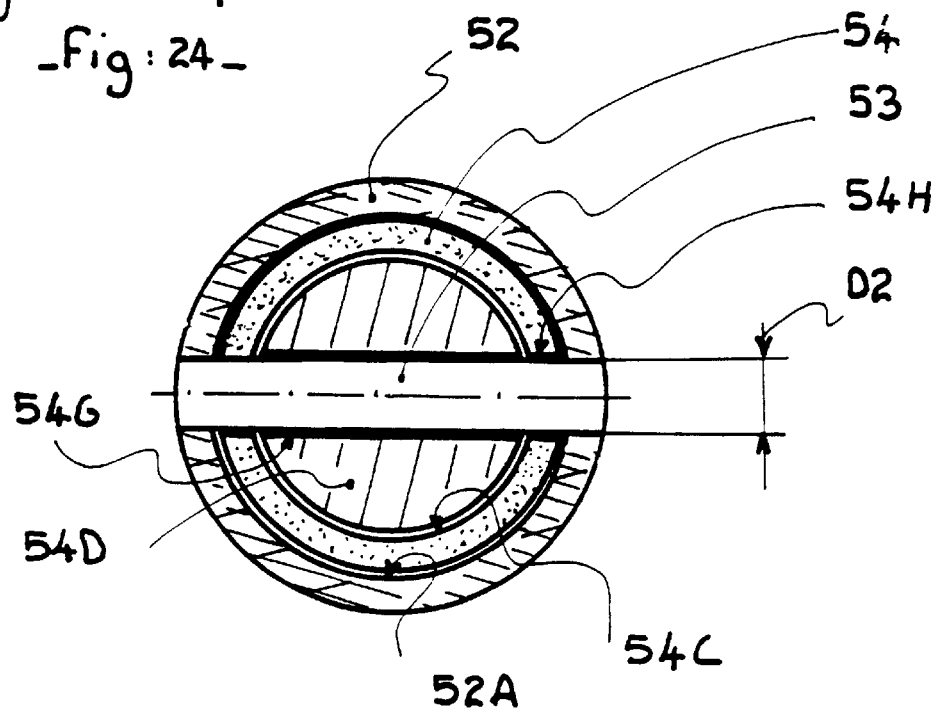

The invention will be clearly understood by means of the following description given as a non-limiting example with the aid of the appended drawings which schematically represent:

FIG 1: a side view of a device equipping the arm rest of a seat,

FIGS. 2 through 9: partial cutaway views of a device according to the invention that equips an arm rest, FIGS. 10 through 21: views of details of the device of the invention, FIG 22: a view in longitudinal section of a detail of embodiment of the invention, FIG. 23: a cross-sectional view of the device of FIG. 22, FIG. 24: a view in longitudinal section of a detail of embodiment of the invention, FIG. 25: a cross-sectional view of the device of FIG. 24, FIG. 26: in larger scale, a detail of a variant of embodiment of the device of the invention.

The drawings show an automatic device 1 for index guiding a so-called movable part 2 pivotably mounted about an axis 3 on a part 4 considered to be stationary relative to this axis 3.

In the example in the description, the movable part 2, such as a vehicle seat arm rest, houses the index guiding device, but this guiding device could, of course, be housed in the covered volume of a seat that supports the arm rest.

Relative to the stationary part 4, the associated part 2 is movable between at least two distinct angular positions P1, P2, P3, P4, P5 delimiting at least two angular sectors A1, A2 which, having a common limit P3, also have a common vertex located on the rotational axis 3, namely:

a primary sector A1 in which this same part 2 can be displaced, at least in a first direction of displacement S1 toward one of the angular limits of this primary sector A1, at least by an angular fraction of this sector, but without the capability to return directly in a second, opposite direction S2 to any previously abandoned incremented position, due to its displacement in the first direction S1, and a secondary sector A2 in which the movable part 2 can be displaced freely.

The limits of the primary A1 and secondary A2 angular sectors can be defined as being those of the characteristic angular positions of any point integral with the movable part 2 that is not on its rotational axis.

The extreme positions P1 and P2 of the stationary 4 and movable 2 parts are determined by stops B1, B1A, B1B, B2, B3, B4, B5, B5A, B5B, B6 which are at least indirectly integral with them.

Advantageously, but in a non-limiting way, there is an elastic means 23 called an assist means, interposed at least indirectly between the movable part 2 and the part 4 considered to be stationary, whose function is to elastically stress these parts 2, 4 in such a way that:

when the movable part 2 is located in a tertiary angular sector A3 which can be superimposed over at least the primary sector A1, it is stressed in the second direction S2 opposite that of the incremental adjustment, and when it is located outside this tertiary sector A3 and particularly in the secondary sector A2, this movable part 2 is stressed in the opposite direction, that is, the first direction S1.

For example, (FIG. 1) this elastic assist means 23 is the type that uses a spring 24 interposed between two points 25, 26 separate from the rotational axis 3, each of which is at least indirectly integral with either the movable 2 or stationary 4 part, and which are aligned along a straight line passing through this rotational axis 3, at least when the movable part 2 is at the limit P3 common to both the primary S1 and secondary S2 angular sectors.

Preferably, the spring is a flexion spring.

This type of spring is particularly advantageous because its slight thickness allows it to be housed in the same case as the index guiding device of the invention.

The presence of this elastic assist means 23 makes it possible to optimize the operation of the device for index guiding the movable part 2 by stressing it elastically in the second direction S2 for locking into an incremented adjustment position, when it is located in the primary sector A1, and in a first direction S1 for leaving this primary sector A1, when it is located in the secondary sector A2.

In the description below, the word comfort simply refers to the position of the movable part 2, specifically in either of the primary and secondary angular sectors A1, A2.

For example, the parts 2, 4 are held together by a joining means described below, which specifically comprises a shaft 52 whose longitudinal axis is the same as the rotational axis 3.

The guiding device 1 uses a mechanism 5 with a ratchet 6, that is, a mechanism 5 essentially comprising a notched ramp 7 in the form of a cylindrical case carried at least indirectly by one of the pivoting parts, and a ratchet 6 that cooperates with the ramp 7 and is itself carried by the other pivoting part.

The term notched ramp 7 designates a supporting surface capable of constituting at least one notch, that is, a supporting surface having at least two facets capable of constituting two stops for cooperating with a complimentary supporting surface of the ratchet 6 in order to stop the rotation of the so-called movable 2 and stationary 4 parts.

A device of this type comprising only one notch is shown in FIGS. 16 through 19.

The term notched ramp 7 also designates a surface of a substantially cylindrical rotating case whose longitudinal axis is the same as the rotational axis 3, which is carried by a part 7A, 47 and comprises an indentation, that is, a plurality of undulations which form teeth of rounded crosssection, each of these undulations having generatrices running approximately parallel to the rotational axis 3.

In standard fashion, the ratchet 6 has a toothed surface 6B and is elastically stressed against the ramp 7 by a component 10 provided for this purpose, which acts on a stop 8 of this ratchet 6.

The elastic component 10 which stresses the ratchet 6 against the ramp 7 produces an elastic action F1 of predefined intensity which determines the intensity of a normal action N that needs to be exerted on the movable part 2, particularly at the level of the pivot axis of the ratchet 6, in order to displace the movable part 2 within the primary angular sector P1 by an angular fraction of this sector A1.

The ratchet mechanism 5 is such that:

when the parts 2, 4 are stressed so as to be angularly displaced in the second direction S2, the locking of the ratchet 6 into a position for locking its toothed surface 6B against the ramp 7 is obtained, and when the parts 2, 4 are angularly stressed in the first direction S1, the elastic disengagement of the indentations of the ratchet 6 and of the ramp 7 is obtained and thus the adjustment of the angular position of the parts in the first direction S1 is made possible.

The guiding device 1 is remarkable in that:

it uses a mechanism 5 having a pivoting ratchet 6, which means that in order to cooperate with the notched ramp 7, it comprises a part 6 pivotably mounted about an axis 6A substantially parallel to the rotational axis 3 of the stationary 4 and movable 2 parts between several positions, including at least:

a so-called fully engaged position SA (FIGS. 2, 4, 10, 12) against the notched ramp 7, that is, a position in which the ratchet 6 has a toothed surface 6B pressed tightly against the ramp 7, an adjustment position SR (FIGS. 3 and 11), that is, a position in which the ratchet 6 has pivoted on its axis 6A and has only one remaining tooth 6C of its toothed surface 6B in contact with the ramp 7, a fully spaced position SE (FIGS. 5 through 9 and 13 through 15), that is, a position in which the ratchet 6 has pivoted on its axis 6A past the adjustment position SR and no longer has any teeth of its toothed surface 6B in contact with the ramp 7, the toothed surface 6B of the ratchet 6 is formed in an angular sector 6S which, in the so-called fully engaged position SA of this surface against the notched ramp 7, is centered on the rotational axis 3 of the movable part and does not include the pivot axis 6A of the ratchet 6, and is disposed, relative to an imaginary line passing through the rotational axis 3 and the pivot axis 4, in such a way that:

when the movable part 2 is stressed in the first direction of displacement S1, and the ratchet 6 is substantially in its fully engaged position SA against the ramp 7, it tends to disengage from the latter and to assume its adjustment position SR, and when the movable part 2 is stressed in the second direction of displacement S2 and the ratchet 6 is in the adjustment position SR, it tends to disengage from the latter and to assume its fully engaged position SA against the ramp.

Therefore, when necessary, the invention allows the utilization of an extensive toothed surface 6B for the contact between ramp and ratchet in the case of a mechanism 5 with a pivoting ratchet.

In the drawings, the various positions SA, SR, SE of the ratchet 6 are indicted by circled groups of two letters SA, SR, SE associated with the ratchet 6.

The automatic index guiding device of the invention comprises a so-called indexed disengaging mechanism whose operation is indexed as a function of the angular position of the parts 2, 4 and which, precisely, either maintains the ratchet 6 in the position spaced apart from its ramp 7 or releases this ratchet 6 toward its ramp.

In one embodiment (FIGS. 2 through 9), the disengaging mechanism is indexed by means of so-called indexing stops (48, 481, 49, 491) which are disposed in such a way that:

when, having been maneuvered in the first direction S1, the movable part 2 reaches an angular limit P3 of the primary sector A1 opposite a limit P1 of this sector A1 from which it was able to be displaced incrementally, the ratchet 6 is moved, at least [in]directly by two opposing indexing stops 48, 481, into the fully spaced position SE, then maintained in this position SE by a first holding means 44, for any position of the movable part 2 comprised within a quaternary angular sector A4 constituted by the juxtaposition of the two primary A1 and secondary A2 sectors, with the exception of the extreme angular position P1 of the primary angular sector A1 from which the indexed adjustment can be obtained, and when the movable part 2, firstly, is maneuvered in the second direction S2 from a position P2 of the secondary sector A2 that is opposite the one P3 from which the ratchet has been brought into and held in the fully spaced position SE, and secondly, reaches the position P1 from which the ratchet must set the incremented adjustment, this ratchet 6 is released, at least into the adjustment position SR.

These technical characteristics allow the movable part 2 to be:

in a first instant and in the first direction S1, angularly displaced in increments so as to reach an adjustment position in the primary sector A1, in a second instant and again in the first direction S1, angularly displaced in increments so as to leave the primary sector A1 and enter into the secondary sector A2, within which it can be displaced freely in either the first or second direction, in a third instant and in the second direction S2, displaced so as to be brought into the extreme position P1 of the primary sector A1 from which the incremented adjustment in the first direction S1 can be obtained.

In this embodiment, the part 7A which carries the ramp 7 is rotationally fixed on the shaft 52 connected to the stationary part 4.

In another embodiment (FIGS. 10 through 15), the device comprises a second elastic holding means 46 such that when, in the primary angular sector A1, the movable part 2 is stressed in the second direction S2, the ratchet assumes its fully engaged position SA against the ramp, and this second holding means 46 maintains the ratchet in this position.

Remarkably, at least one of the elastic means 44, 46 for holding the ratchet, both in the so-called fully engaged position SA against the notched ramp 7 and in the fully spaced position SE apart from the notched ramp, exerts on the ratchet 6 an action which tends to maintain it in the extreme position chosen, notwithstanding the existence of at least one of two actions, namely an action due to the mass of the ratchet, such as gravitational action, and the action F1 of the elastic component 10.

Remarkably, in order to allow the storage of at least one adjustment position PMR of the movable part chosen in the primary angular sector A1, and to allow, first of all, the release of this movable part 2 from the adjustment position PMR chosen in this primary sector A1 to any chosen position in the secondary sector A2 within which this movable part 2 can be moved freely, and secondly, the free return of this movable part 2 from the secondary sector A2 to the stored adjustment position PMR in the primary sector A1, the device comprises a storage means 45 and this means 45 comprises:

the second elastic means 46 for holding the pivoting ratchet 6 in the so-called fully engaged position SA against the notched ramp 7, that is, the position in which the ratchet 6 has a toothed surface 6B pressed tightly against the ramp 7, which means produces its action with an intensity that is at least enough to guarantee an action F3 for pressing the ratchet against the ramp 7, which action F3 has an intensity such that the application of the normal action N that needs to be exerted on the movable part 2, particularly at the level of the pivot axis of the ratchet 6, in order to displace it within the primary angular sector A1 by an angular fraction of this sector, is ineffective in displacing the ratchet 6 relative to the ramp 7, a so called carrying part 47 which carries the ramp 7 and is rotatable relative to the stationary part 4, substantially around the rotational axis 3, between two opposite angular positions P2, P1, namely, a position P2 determined by the limit P2 of the secondary angular sector A2, which defines the angular limit beyond which the movable part 2 cannot be displaced, and another position P1 determined by the limit P1 of the primary angular sector A1 from which the incremented adjustment can be obtained and in which it is subjected to an elastic action F4 which, being produced by an element 471 carried at least indirectly by the stationary part 4, has an intensity such that it maintains it in this primary position P1 until the intensity of the normal action N applied to the movable part exceeds the value of the intensity that needs to be exerted on this movable part 2, particularly at the level of the pivot axis of the ratchet 6, in order to displace it within the primary angular sector P1 by an angular fraction of this sector, driving the carrying part in rotation around the rotational axis 3, those B3, B4 among the stops B1, B1A, B1B, B2, B3, B4, B5, B5A, B5B, B6 which determine the extreme position P2 of the secondary angular sector A2 opposite that P1 of the primary sector A1 from which the incremented adjustment can be obtained, one of which is carried by the ratchet 6, the other being carried at least indirectly by the stationary part 4, are disposed and oriented not only so as to fulfil their function of determining the extreme position P2, but also in such a way that they define, before this position P2, a position P4 in which they temporarily prevent the displacement in the first direction S1 toward the adjacent extreme position P2, precisely until the intensity of the normal action N exerted on the movable part 2 is enough to release the ratchet 6 from its engaged position SA, in which the second elastic holding means 46 is restraining it.

These technical characteristics make it possible for an incremented adjustment position (PMR) of the primary sector A1 to be stored, which means that after storage, notwithstanding the displacement of the movable part 2 in the secondary sector A2, the incremented adjustment position (PMR) chosen in the primary sector A1 can be retrieved simply by displacing the movable part 2 in the second direction S2, without any need to return this movable part to the extreme position P1 of the primary sector A1 from which the incremented adjustment can be obtained.

In a way that is noteworthy, the second elastic means 46 for holding the pivoting ratchet 6 in the fully engaged position SA against the notched ramp produces an action having an intensity such that the action of the elastic assist means 23 that stresses the movable part in the extreme position P2 of the secondary sector A2 is of itself insufficient to release the ratchet 6 from its fully engaged position SA against the ramp.

For this reason, the return of the movable part 2 to the position P2 under the effect of the elastic assist means 23 that stresses it does not delete the stored adjustment position PMR.

It is the person who maneuvers the movable part, such as the arm rest, equipped with this device, who must exert the action that will displace this movable part to the extreme position P2 of the secondary sector A2.

These technical characteristics make it possible for the stored adjustment position PMR to be erased in some way, but this erasure is not automatically induced simply because the movable part 2 is displaced in the first direction S1, toward the extreme position of the secondary sector A2 opposite that P1 of the primary sector from which the incremented adjustment can be obtained.

Therefore, when the movable part 2 is an arm rest, the erasure of the adjustment position PMR cannot be caused simply by raising the arm rest, whether or not the latter is assisted by the elastic assist means 23 for this purpose.

The elastic means 44, 46 for holding the ratchet are means of the ratchetable type.

This characteristic specifically makes it possible to protect the operation of the device from the influence of any vibration.

The second elastic means 46 for holding the pivoting ratchet 6 in the so-called fully engaged position SA against the notched ramp 7, that is, the position in which the ratchet 6 has a toothed surface 6B pressed tightly against the ramp 7, is a type that can be activated by acting on the movable part in the second direction S2.

Remarkably, the second elastic holding means 46 can be activated by an action having an intensity such that the action of the elastic assist means 23 is ineffective in activating it.

This allows the means 46 to be activated only by the action of a person.

The storage means 45 make it possible, when an angular position PR, i.e., an incremented adjustment position, of the movable part 2 has been chosen in the primary angular sector A1, this position PR can be stored, and because of this, the movable part 2 can be moved freely in the first direction S;1 to any position, then returned to the stored position by being driven in the second direction S2.

In one embodiment, in order to constitute the indexed means for disengaging the ratchet 6, the device of the invention comprises at least:

one stop 48, B3 integral with the ratchet 6 and one stop 481, B4 integral with the ramp 7, which stops 48, B3, 481, B4 are disposed so that when, having been maneuvered in the first direction S1, the movable part 2 reaches the angular limit P3 of the primary sector A1 opposite that P1 of this sector A1 from which it was able to be displaced incrementally, the ratchet 6 is brought into the fully spaced position SE; then, when the movable part 2 is stressed in the first direction S1 past this position P3, it is held in this position SE by a first holding means 44, for any position of the movable part 2 comprised within a quaternary angular sector A4 constituted by the juxtaposition of the two primary A1 and secondary A2 sectors, with the exception of the extreme angular position P1 of the primary angular sector Al from which the indexed adjustment can be obtained, and one stop 49 integral with the ratchet 6 and one stop 491 integral with the ramp 7, which stops 49, 491 are disposed so that when the movable part 2, firstly, is maneuvered in the second direction S2 from the position P2 of the secondary sector A2 which is opposite that P3 from which the ratchet has been brought into the fully spaced position SE, and secondly, reaches the position P1 from which the ratchet must set the incremented adjustment, this ratchet 6 is released, at least into the adjustment position SR.

In a way that is noteworthy, the part 7A that carries the ramp 7 also carries a stop B4A that is intended to cooperate with a stop 49 integral with the ratchet 6 so as to produce, in the extreme position P2 of the secondary sector S2 opposite that P1 in the primary sector A1 from which the incremented adjustment can be obtained, a relative locking that tends to hold the movable part 2 in this extreme position P2 when it is stressed in the secondary sector S2.

In one embodiment, the stops B1, B2, B3, B4, which make it possible to define the two extreme positions P1, P2 of the movable part 2 relative to the stationary part, are carried by the ratchet 6 and by the part that carries the ramp 7.

In another embodiment:

those B3, B4 among the stops B1, B1A, B1B, B2, B3, B4, B5, B5A, B5B, B6 which specifically determine the extreme position P2 of the secondary angular sector A2 opposite that P1 of the primary sector A1 from which the incremented adjustment can be obtained, one of which B3 is carried by the ratchet 6, the other B4 being carried by an additional part 50 which, being distinct from the part 47 that carries the ramp 7, is bound in rotation with the stationary part 4, relative to the rotational axis 3 of the movable part, those B1, B1A, B1B, B2, B3, B4, B5, B5A, B5B among the stops B1, B1A, B1B, B2, B3, B4, B5, B5A, B5B, B6 which determine the extreme position P1 of the primary sector A1 from which the incremented adjustment can be obtained, are carried by the ratchet 6, the part 47 carrying the ramp, and the part 50 bound in rotation with the stationary part 4, in such a way that in this extreme position P1, the fixed additional part 50 and the part 47 carrying the ramp 7 cooperate by means of two opposing stops B2, B6, while the ratchet 6 and the part 47 carrying the ramp 7 also cooperate through two opposing stops B1, B5.

In this embodiment, it is not the part 47 carrying the ramp 7 that is rotationally fixed on the shaft 52 connected to the stationary part 4, but the additional part 50.

In a way that is noteworthy, the ratchet 6 and the part 47 that carries the ramp 7 have stops B1A, B1B, B5A, B5B which, in the extreme position P1 of the primary angular sector A1 from which the incremented adjustment can be obtained, are disposed so that B1A, B5A cooperate in this position P1 to obstruct the passage of the ratchet 6 from the fully spaced position SE to the fully engaged position SA and to favor its adjustment position SR, and so that B1B, B5B obstruct the movement of the movable part 2 in the second direction S2.

The index guiding device and the stationary part are joined by an assembly means 51 (FIGS. 22 and 23) which comprises:

a rotating shaft 52 having a longitudinal axis 3 and a predetermined diameter E1, comprising two ends 52B, 52C, one of which ends 52B is integral with either the stationary part 4 or one of the parts 7A, 50 of the device 1, which must be rotationally fixed about the rotational axis 3, the other end being free and carrying a rotating cylindrical pin 53 of predetermined diameter D2, at least one section of which 53A projects radially from the surface of the shaft at a predetermined distance E1 from this end 52C, a supporting piece 54 which, being connected to a structure 55 relative to which the movable part 2 must be rotationally index guided, has:

a front face 54A, opening into this front face 54A, first, a bore 54B having a longitudinal axis 3 approximately orthogonal to this front face 54A and a diameter D3 greater than that D1 of the shaft 52, and secondly, at least one groove 54R that extends radially from the bore 54B and has a cross-section and dimensions such that it allows the lateral insertion of a section 53A of the pin 53, bordering the bore 54B and located a predetermined distance E2 from the so-called front face 54A, an opposite, so-called dorsal face 54E.

a shouldered part 56 comprising:

a shaft 56A having a diameter D4, capable of being inserted so as to slide in the bore 54B of the supporting piece a so-called dorsal face 56B intended to come to rest against the front face 54A of the supporting piece 54 when the shaft 56 is inserted into the bore 54B of this part 54, cut into the shaft 56A, a bore 56C having a diameter D5, capable of receiving the sliding free end 52C of the shaft 52 carrying the pin 53, a front face 56D which extends in a plane approximately orthogonal to the longitudinal axis 3 of the bore 56C, opening into the front face 56D, at least one groove 56E which extends radially to the bore 56A and which has a cross section and dimensions such that it allows a section 53A of the pin 53 placed in the groove 54R of the supporting piece 54 to be laterally inserted and elastically held in this position, carried radially by the shaft 56A in an elastic way, at least one stop 56G intended to cooperate at least locally with the dorsal face 54D of the supporting piece 54 after this shaft 56A has been inserted far enough into the bore 54B of this supporting piece 54 for the front face 54A of this piece to support the dorsal face 56B of the shouldered part 56.

Preferably, the supporting piece 54 is made of metallic material and the shouldered part 56 is made of plastic material.

The supporting piece 54 receives the potential stresses exerted by the pin on the surfaces of the groove that contains it.

The only specific function of the shouldered part is to elastically hold the pin so that it rests in the groove of the supporting piece.

In a variant of embodiment (FIGS. 24 and 25), the index guiding device and the stationary part are joined by an assembly means 51, which comprises:

a first rotating shaft 52 comprising an axial bore 52A of predetermined diameter D1 and two ends 52B, 52C, one of which ends 52B is free, the other end 52C, firstly, being integral with either the stationary part 4 or one of the parts 7A, 50 of the device 1, which must be rotationally fixed about the rotational axis 3, and secondly, carrying a rotating cylindrical pin 53 of predetermined diameter D2, which extends radially into the bore 52A at a predetermined distance from the terminal face of this end 52C, a second rotating shaft 54 having a diameter D3, capable of being inserted so as to slide in the bore of the first shaft and comprising two ends 54A, 54B, one of which ends 54A is integral with the part opposing the one with which the bored shaft 52 is integral, while the other end 54B houses, in a rotating cylindrical housing 54C, an insert 54D made of elastic material which, being translationally and rotationally fixed, has a terminal face 54E substantially in the plane of the terminal face 54F of this end 54B, which end has, opening into each of the terminal faces 54E, 54F of the second shaft 54 and of the insert 54D, a longitudinal groove 54G, 54H which in the second shaft 54 has a width and a depth such that it allows the lateral insertion of the pin 53 substantially at the end point of the longitudinal insertion of the first shaft 52 into the bore, and which in the insert 54D has a cross-section such that it allows the lateral insertion and the elastic retraction of the pin 53.

Preferably, in one or both of the embodiments of the assembly device 51, the shaft 52 is carried by the arm rest 2.

These technical characteristics make it possible to construct an assembly means that is particularly well suited to the assembly of the index device 1 and the stationary part 4, and to the operation of this device.

In effect, the elastic retraction and the partial cylindrical support of the side of the pin, eliminates the need for caulking the contact surfaces, thus guaranteeing that the assembled elements can be easily disassembled and reassembled after a long period of use.

In another embodiment (FIGS. 16 through 19), the disengaging mechanism is indexed by means of so-called indexing stops (48, 481, 482, 49, 491), which are disposed in such a way that:

when, having been maneuvered in the first direction S1, the movable part 2 reaches an angular limit P3 (FIG. 16) of the primary sector A1 opposite a limit P1 of this sector A1 from which it was able to be displaced incrementally, the ratchet 6 is moved, at least indirectly by two opposing indexing stops 48, 481, into the fully spaced position SE, then held in this position SE by a first holding means 4, for any position of the movable part 2 comprised in the secondary sector A2, with the exception of an extreme angular position P2 opposite that P3 of the primary angular sector A1 from which the ratchet is brought into the fully spaced position, and when, being maneuvered in the second direction S2, the movable part 2 reaches an opposite position P2 (FIG. 18), this ratchet is released, at least into the adjustment position 52.

These technical characteristics allow the movable part 2 to simply be moved into a position in which its movement in the second direction is obstructed.

For example, when the movable part is an arm rest of the vehicle seat, it makes it impossible for the arm rest, after having been brought to the raised position, to be returned directly to the substantially horizontal position as a result of a sudden deceleration of the vehicle.

In this embodiment, first of all, the stationary part 4 carries a rotating cylindrical shaft 52 diametrically intersected by a cylindrical pin 60 whose ends 60A, 60B form two projections above the cylindrical surface 52A of the shaft, in such a way that one 60A of these projections 60A, 60B constitutes, through the opposing surfaces 481, 482, a notch of the notched ramp, and secondly, the ratchet has a single slot having surfaces 7, 48 intended to cooperate with the surfaces 481, 482 of the notch of the ramp 7.

Remarkably, the device comprises a locking means 80 intended to come into play when the movable part 2 is moved into the second position P2, whose functions are:

to prevent the return of the movable part to the first position P1, that is, to obstruct its movement in the second direction S2, to allow this return after an action of predetermined intensity has been applied to the movable part so as to displace it in the first direction S1, past the second position P2.

In one embodiment (FIG. 20) the disengaging mechanism is indexed by means of so-called indexing stops (48, 481, 49, 491, 61, 62), which are disposed in such a way that:

when, being maneuvered in the first direction S1, the movable part 2 reaches an angular limit P3 of the primary sector Al opposite a limit P1 of this sector A1 from which it was able to be displaced incrementally, the ratchet 6 is moved, at least directly by two opposing indexing stops 48, 481, into the fully spaced position SE, then held in this position SE by a first holding means 44, for any position of the movable part 2 comprised within a quaternary angular sector A4 constituted by the juxtaposition of the two primary A1 and secondary A2 angular sectors, with the exception of the extreme angular position P1 of the primary angular sector A1 from which the indexed adjustment can be obtained, and when the movable part 2, firstly, is maneuvered in the second direction S2 from a position P2 of the secondary sector A2 which is opposite that P1 from which the ratchet has been brought into and held in the fully spaced position SE and secondly, reaches the position P1 from which the ratchet must set the incremented adjustment, this ratchet 6 is released, at least indirectly by two opposing stops B1, B5, at least into the adjustment position SR, when the movable part, firstly, is maneuvered in the first direction S1 from the second position P2 of the secondary sector A2 which is opposite this third position P3 from which the ratchet has been brought into and held in the fully spaced position SE, and secondly, passes this second position P2 to reach a distinct fourth position P4, this ratchet 6 is released, at least indirectly by two opposing stops B3, 61, at least into the position where it rests against a second ramp 71, when the movable part, firstly, is maneuvered in the first direction S1 from the fourth position P4, and secondly, passes this fourth position to reach a distinct fifth position P5, the ratchet 6 is moved at least indirectly by two opposing stops 48, 62, then held by the first holding means 44, in the fully spaced position, for any position comprised between this fifth position P5 and the first position P1.

These technical characteristics allow the movable part 2 to simply be moved into a position in which its displacement in the second direction is obstructed.

In the embodiment represented in FIG. 20, the stop 61 is retractable when it is stressed by the opposing stop B3 in the second direction S2.

When the device of the invention equips a vehicle seat arm rest, this locking means makes it possible to prevent this arm rest, after it has been raised, from returning to an approximately horizontal position due to inertia, particularly as a result of a sudden deceleration of the vehicle, which could be dangerous for the occupant of the seat.

Remarkably, in another embodiment, the locking means comprises:

arranged on the additional part 50, a certain number of stops 50A, 50B, a pivoting part 81 which, pivoting on the same axis 6A as the ratchet 6, carries:

at least one first stop 82 intended to cooperate with a stop 50A carried by the additional part 50 in a position characteristic of the second position P2, in such a way as to obstruct the displacement of the movable part 2 in the second direction S2, at least one second stop 83 intended to cooperate with a stop 50B, which is also carried by the additional part 50, in a position characteristic of the second position P2, in such a way as to cause the first stop 82 to engage with its opposing stop 50A when the movable part 2 is displaced in the first direction S1, at least one third stop 84 intended to cooperate with a stop 50B carried by the additional part 50 in a position characteristic of the second position P2, in such a way as to cause the disengagement of the first stop 82 from its opposing stop 50A when the movable part 2 is stressed in the first direction S1, an elastic element 85 that stresses the pivoting part 81 in a direction for applying its first stop 50A, an elastic means 86 for holding the pivoting part 81 in the position reached under the effect of the third stop 84, that is, when it has caused the first stop 82 to disengage from its opposing stop 50A after the movable part 2 has been stressed in the first direction S1.

When the index guiding device of the invention is intended to equip an arm rest of at least one seat of a vehicle which, being movable along a trajectory and in a predetermined direction, can be subjected to at least one deceleration of equally predetermined value, this device comprises a means M for detecting the deceleration of predetermined value and for locking the ratchet 6 into a fully engaged position against at least one ramp 7, 71, such as the second ramp 71.

In a preferred embodiment, the means M for detecting the deceleration of predetermined value and for locking the ratchet 6 into a fully engaged position against the ramp 7, 71, comprises:

integral with the ratchet 6, a stop M1 disposed and oriented so as to receive, in the engaged position of the ratchet against the ramp 7, 71, an action for holding it in the engaged position, a ball M2 of predetermined mass, a means M3 for guiding the ball M1 along a trajectory substantially parallel to that of the movement of the vehicle, between two positions, one of which is a stand-by position in which it is spaced apart from the stop M1 for locking the ratchet 6, and an active position in which it is placed against said locking stop M1, a means M4 for maintaining the ball M2 in the stand-by position until this ball is subjected to a deceleration reflecting the deceleration beyond which the ratchet 6 must be held in the engaged position against the second ramp 71.

Advantageously, the means M for detecting a deceleration and for locking the ratchet is disposed at the level of a first elastic means 44 for holding the ratchet 6.

For example the holding means M4 are comprised of at least one stop that is elastically retractable under the effect of an action of predetermined value.

Preferably, the means M for detecting a deceleration and locking the ratchet comprises a means M5 for opposing the return of the ball M2 to the stand-by position.

One skilled in the art would be able to determine, as a function of the mass of the ball and the value of the deceleration, the elastic resistance value of the stop to which the means M for detecting the deceleration of predetermined value and for locking the ratchet 6 in the fully engaged position against the ramp 7, 71, such as the second ramp 71, must be sensitive.

What is claimed is:

1. An automatic index guiding device (1) in combination with a movable part (2) pivotably mounted about a rotational axis (3) on a part (4) arranged to be stationary relative to the rotational axis (3), the movable part (2) being movable relative to the stationary part (4) between at least two distinct angular positions (P1, P2) delimiting at least two angular sectors (A1, A2), said at least two angular sectors (A1, A2) having a common limit (P3) and a common vertex located on the rotational axis (3), comprising:
   a) a primary sector (A1), in which movable part (2) is arranged to be displayed, at least in a first direction of displacement (S1) toward one of the angular positions (P1, P2) of said primary sector (A1), at least by an angular fraction of said primary sector (A1), but without the capability to return directly in a second, opposite direction (S2) to any previously abandoned position, due to said displacement in the first direction (S1),
   b) a secondary sector (A2) within which said movable part (2) can be moved freely,
   (c) a first ratchet (7A) including a notched ramp (7) in the form of a cylindrical case carried indirectly by one of the pivoting parts, and a second ratchet (6) having a toothed surface (6B) that cooperates with the notched ramp (7), said second ratchet (6) being carried by the other pivoting part, said second ratchet (6) being pivotly mounted about an axis (6A) substantially parallel to the rotational axis (3) of the stationary part (4) and movable part (2) wherein:
      i) when the movable part (2) and stationary part (4) are stressed so as to be angularly displaced in the second direction (S2), immobilization of the second ratchet (6) in a locked position with toothed surface (6B) against the ramp (7) of the first ratchet (7A) is obtained, and
      ii) when the movable part (2) and the stationary part (4) are angularly stressed in the first direction (S1), an elastic disengagement of notches of the ramp (7) and the second ratchet (6) is obtained, and as a result of said elastic disengagement, adjustment of the angularly position of the movable part (2) and the stationary part (4) in the first direction (S1) occurs,
   d) said second ratchet (6) being arranged to pivot about said axis (6A) between various positions including
      i) a fully engaged position (SA) in which the second ratchet (6) has a toothed surface (6B) pressed tightly against the notched ramp (7) of the first ratchet (7A),
      ii) an adjustment position (SR) in which the second ratchet (6) has pivoted on its axis (6A) and has only one remaining tooth (6C) of its toothed surface (6B) in contact with the notched ramp (7),
      iii) a fully spaced position (SE) in which the second ratchet (6) has pivoted on its axis (6A) past the adjustment position (SR) and no teeth of toothed surface (6B) are in contact with the notched ramp (7), and
   (e) said toothed surface (6B) of the second ratchet (6) being formed in an angular sector (6S) wherein the fully engaged position (SA) of the toothed surface (6B) is arranged to be operationally in the fully engaged position (SA) against the notched ramp (7) when the angular sector (6S) is centered on the rotational axis (3) of the movable part (2) and does not comprise the pivot axis (6A) of said second ratchet (6) and is disposed relative to an imaginary line passing through the rotational axis (3) and the pivot axis (6a) wherein:
      i) when the movable part (2) is stressed in the first direction of displacement (S1), and the second ratchet (6) is substantially in its fully engaged position (SA) against the ramp (7), the second ratchet (6) disengages from the fully engaged position (SA) against the ramp (7) and assumes adjustment position (SR), and
      ii) when the movable part (2) is stressed in the second direction of displacement (S2) and the second ratchet (6) is in the adjustment position (SR), the second ratchet (6) disengages from the adjustment position (SR) and assumes its fully engaged position (SA) against the ramp, and further comprising an indexed disengaging mechanism having an operation indexed as a function of an angular position of movable ;part (2) and stationary part (4) and is arranged to cause the second ratchet (6) to have one of a first mode and second mode, wherein the first mode includes the second ratchet (6) being held in a spaced position apart from ramp (7), and the second mode includes the second ratchet (6) being released toward ramp (7), said disengaging mechanism being indexed by indexing stops (48, 481, 49, 491) disposed in a way that:
   a) when movable part (2) reaches an angular limit (P3) of the primary sector (A1) opposite a limit (P1) of sector (A1) from which the movable part (2) was able to be displaced incrementally in the first direction (S1), the second ratchet (6) is moved, at least indirectly by two opposing indexing stops (48, 481), into the fully spaced position (SE), then the second ratchet (6) is held in position (SE) by a first elastic holding means (44), for any position of the movable part (2) comprised within a quarternary angular sector (A4) constituted by the juxtaposition of the two primary (A1) and secondary (A2) sectors, with the exception of the extreme angular position (P1) of the primary angular sector (A1) from which indexed adjustment can be obtained, and
   b) when the movable part (2), firstly, is maneuvered in the second direction (S2) from a position (P2) of the secondary sector (A2) which is opposite position (P3) from which the second ratchet (6) has been brought into and held in the fully spaced position (SE), and secondly, reaches the position (P1) from which the second ratchet (6) must set the incremented adjustment, said second ratchet (6) is released, at least into the adjustment position (SR).

2. The device according to claim 1, wherein the disengagement is indexed by means of indexing stops (48, 481, 482, 49, 491), said stops (48, 481, 482, 49, 491) being disposed in such a way that:
   a) when, having been maneuvered in the first direction (S1), the movable part (2) reaches an angular limit (P3) of the primary sector (A1) opposite a limit (P1) of sector (A1) from which the movable part (2) was able to be displaced incrementally, the second ratchet (6) is moved, at least indirectly by two opposing indexing stops (48, 481) into the fully spaced position (SE), then held in position (SE) by a first holding means (44), for any position of the movable part (2) comprised within the secondary sector (A2), with the exception of an extreme angular position (P2) opposite position (P3) of the primary angular sector (A1) from which the second ratchet (6) is brought into the fully spaced position (SE), and
   b) when, having been maneuvered in the second direction (S2), the movable part (2) reaches an opposite position (P2), said second ratchet (6) is released, at least into the adjustment position (SR).

3. The device according to claim 1, further comprising: a second elastic holding means (46) arranged to hold the second ratchet (6) in the fully engaged position (SA) against the notched ramp (7) when the movable part (2) is operationally positioned in the primary angular sector (A1) and is stressed in the second direction (S2).

4. The device according to claim 3, wherein at least one of the elastic means (44, 46) for holding the second ratchet (6), both in the fully engaged position (SA) against the notched ramp (7) and in the fully spaced position (SE) apart from the notched ramp, exerts on the second ratchet (6) an action that tends to hold the second ratchet (6) in a selected extreme position, notwithstanding the existence of at least one of either an action due to gravitational action, or an action (F1) of an elastic component (10) arranged to bias the second ratchet (6).

5. The device according to claim 4, wherein in order to allow storage of at least one adjustment position (PMR) of the movable part (2), chosen in the primary angular sector (A1), and to allow, firstly, release of said movable part (2) from an adjustment position (PMR) chosen in said primary sector (A1) to any position chosen in the secondary sector (A2) in which said movable part (2) can be moved freely, and secondly, free return of said movable part (2) from the secondary sector (A2) to the stored adjustment position (PMR) in the primary sector (A1), the device comprises a storage means (45) comprising:

a) the second elastic means (46) for holding the pivoting second ratchet (6) in the fully engaged position (SA) against the notched ramp (7), that is, the position in which the second ratchet (6) has a toothed surface (6B) pressed tightly against the ramp (7), said second elastic means (46) acting with an intensity that is at least enough to guarantee an action (F3) for applying the second ratchet (6) against the ramp (7), said action (F3) having an intensity such that application of a normal action (N) required to be exerted on the movable part (2), particularly at the level of the pivot axis of the second ratchet (6), in order to displace the second ratchet (6) within the primary angular sector (A1) by an angular fraction of said sector (A1), is ineffective in displacing the second ratchet (6) relative to the ramp (7), b) a carrying part (47) that carries the ramp (7) and is rotatable relative to the stationary part (4), substantially around the rotational axis (3), between two opposite angular positions (P1, P2), wherein:

i) a position (P2) of the secondary angular sector (A2), which defines the angular limit beyond which the movable part (2) cannot be displaced, and ii) another position (P1) of the primary angular sector (A1) from which the incremented adjustment can be obtained and in which the incremented adjustment is subjected to an elastic action (F4) which, being produced by an element (471) carried at least indirectly by the stationary part (4), has an intensity such that the incremented adjustment holds element (471) in first position (P1) until the intensity of the normal action (N) applied to the movable part (2) exceeds a value of intensity that needs to be exerted on said movable part (2), particularly at the level of the pivot axis of the second ratchet (6), in order to displace the second ratchet (6) in the primary angular sector (A1) by an angular fraction of the sector (A1), driving the carrying part (47) around the rotational axis (3), and c) stops (B1, B1A, B1B, B2, B3, B4, B5, B5A, B5B, B6), including stops (B3, B4) which determine the extreme position (P2) of the secondary angular sector (A2) opposite position (P1) of the primary sector (A1) from which the incremented adjustment can be obtained, wherein one of said stops (B3, B4) is carried by the second ratchet (6), the other of said stops (B3, B4) being carried at least indirectly by the stationary part (4), are disposed and oriented not only so as to fulfill a function of determining the extreme position (P2), but also in such a way that the stops (B3, B4) define, before position (P2), a position (P4) in which the stops (B3, B4) temporarily prevent displacement in the first direction (S1) toward the adjacent extreme position (P2), precisely until the intensity of the normal action (N) exerted on the movable part (2) is enough to release the second ratchet (6) from a fully engaged position (SA) wherein the second ratchet (6) is restrained in said fully engaged position (SA) by the second elastic holding means (46).

6. The device according to claim 5, wherein the second elastic means (46) for holding the pivoting second ratchet (6) in the fully engaged position (SA) against the notched ramp (7) produces a response of such intensity that an action of an elastic assist means (23) that stresses the movable part (2) in the extreme position (P2) of the secondary sector (A2) is of itself insufficient to release the second ratchet (6) from its fully engaged position (SA) against the notched ramp (7).

7. The device according to claim 6, wherein the second elastic means (46) for holding the pivoting second ratchet (6) in the fully engaged position (SA) against the notched ramp (7), wherein the fully engaged position (SA) includes the second ratchet (6) having a toothed surface (6B) pressed tightly against the notched ramp (7), said second elastic means (46) arranged to be activated by pressure on the movable part (2) in the second direction (S2).

8. The device according to claim 7, wherein the second ratchet (6) is an indexed means for disengaging the second ratchet (6), the second ratchet (6) comprising:

a) one stop (48, B3) integral with the second ratchet (6) and one stop (481, B4) integral with the notched ramp (7), wherein stops (48, B3, 481, B4) are disposed so that when, having been maneuvered in the first direction (S1), the movable part (2) reaches the angular limit (P3) of the primary sector (A1) opposite position (P1) of sector (A1) from which the movable part (2) was able to be displaced incrementally, the second ratchet (6) moves into the fully spaced position (SE); then, when the movable part (2) is stressed in the first direction (S1) past position (P3), the movable part (2) is held in position (SE) by a first holding means (44), for any position of the movable part (2) within a quaternary angular sector (A4) constituted by the juxtaposition of the two primary (A1) and secondary (A2) sectors, with the exception of the extreme angular position (P1) of the primary angular sector (A1) from which the indexed adjustment can be obtained, and b) one stop (49) integral with the second ratchet (6) and one stop (491) integral with the notched ramp (7), wherein stops (49, 491) are disposed such that when the movable part (2), firstly, is maneuvered in the second direction (S2) from the position (P2) of the secondary sector (A2) which is opposite position (P3) from which the second ratchet (6) has been brought into the fully spaced position (SE), and secondly, reaches the position (P1) from which the second ratchet (6) must set the incremented adjustment, the second ratchet (6) is released, moving at least into the adjustment position (SR).

9. The device according to claim 8, further comprising: stops (B1, B1A, B1B, B2, B3, B4, B5, B5A, B5B, B6) wherein a) stops (B3,B4) specifically determine the extreme position (P2) of the secondary angular sector (A2) opposite position (P1) of the primary sector (A1) from which the incremented adjustment can be obtained, wherein stop (B3) is carried by the second ratchet (6), the other stop (B4) being carried by an additional part (50), wherein part (50) is distinct from the part (47) carrying the notched ramp (7), is bound in rotation with the stationary part (4), relative to the rotational axis (3) of the movable part (2), and b) stops (B1, B1A, B1B, B2, B3. B4, B5, B5A, B5B) determine the extreme position (P1) of the primary sector (A1) from which the incremented adjustment can be obtained, said stops (B1, B1A, B1B, B2, B3. B4, B5, B5A, B5B) being carried by the second ratchet (6), the part (47) carrying the notched ramp (7), and the additional part (50) bound in rotation with the stationary part (4), in such a way that in said extreme position (P1), the fixed additional part (50) and the part (47) carrying the notched ramp (7) cooperate by means of two opposing stops (B2, B6), while the second ratchet (6) and the part (47) carrying the notched ramp (7) also cooperate by means of two opposing stops (B1, B5).

10. The device according to claim 9, wherein the stationary part (4) carries a rotating cylindrical shaft (52) diametrically intersected by a cylindrical pin (60) having ends (60A, 60B) forming two projections above the cylindrical surface (52A) of the shaft (52), in such a way that one (60A) of ends (60A, 60B) constitutes, through opposing indexing stops (481, 482), a notch of the notched ramp (7), and the second ratchet (6) has a single slot having indexing stop (48) intended to cooperate with the indexing stops (481,482) of the notch of the ramp (7).

11. The device according to claim 10, wherein the disengaging indexed by indexing stops (48, 481, 49, 491, 61, 62) which are disposed in such a way that:

a) when, having been maneuvered in the first direction (S1), the movable part (2) reaches an angular limit (P3) of the primary sector (A1) opposite a limit (P1) of sector (A1) from which the movable part (2) was able to be displaced incrementally, the second ratchet (6) is moved at least indirectly by two opposing indexing stops (48, 481) into the fully spaced position (SE), then the second ratchet (6) is held in position (SE) by a first holding means (44), for any position of the movable part (2) comprised within a quaternary angular sector (A4) constituted by the juxtaposition of the two primary (A1) and secondary (A2) sectors, with the exception of the extreme angular position (P1) of the primary angular sector (A1) from which the indexed adjustment can be obtained, b) when the movable part (2), firstly, is maneuvered in the second direction (S2) from a position (P2) in the secondary sector (A2) which is opposite position (P3) from which the second ratchet (6) has been brought into and held in the fully spaced position (SE), and secondly, reaches the position (P1) from which the second ratchet (6) must set the incremented adjustment, said second ratchet (6) is released, at least indirectly by two opposing stops (B1, B5), at least into the adjustment position (SR), c) when the movable part (2), firstly, is maneuvered in the first direction (S1) from the second position (P2) of the secondary sector (A2) which is opposite a third position (P3) from which the second ratchet (6) has been brought into and held in the fully spaced position (SE), and secondly, passes the second position (P2) to reach a distinct fourth position (P4), the second ratchet (6) is released, at least indirectly by two opposing stops (B3, 61), at least into the position where the second ratchet (6) rests against a second ramp (71), and d) when the movable part, firstly, is maneuvered in the first direction (S1) from the fourth position (P4), and secondly, passes the fourth position to reach a distinct fifth position (P5), the second ratchet (6) is moved at least indirectly by two opposing stops (48, 62), then held by the first holding means (44), in the fully spaced position, for any position comprised between the fifth position (P5) and the first position (P1).

12. The device according to claim 10, wherein the locking means comprises:

a) a number of stops (50A, 50B) arranged on the additional part (50), b) a pivoting part (81), arranged to pivot on the same axis (6A) as the second ratchet (6), wherein said second ratchet (6) carries:

i) at least one first stop (82) cooperating with a stop (50A) carried by the additional part (50) in a position characteristic of the second position (P2), in such a way as to obstruct the displacement of the movable part (2) in the second direction (S2), ii) at least one second stop (83) cooperating with a stop (50B) carried by the additional part (50) in a position characteristic of the second position (P2), in such a way as to cause the first stop (82) to engage with the opposing stop (50A) of the first stop (82) when the movable part (2) is displaced in the first direction (S1), iii) at least one third stop (84) cooperating with a stop (50B) carried by the additional part (50) in a position characteristic of the second position (P2), in such a way as to cause disengagement of the first stop (82) from opposing stop (50A) of the first stop (82) when the movable part (2) is stressed in the first direction (S1), c) an elastic element (85) that stresses the pivoting part (81) in a direction for applying first stop (50A), and d) an elastic means (86) for holding the pivoting part (81) in the position reached under the effect of the third stop (84), that is, when the pivoting part (81) has caused the first stop (82) to disengage from opposing stop (50A) of the first stop (82) after the movable part (2) has been stressed in the first direction (S1).

13. The device according to claim 12, wherein the index guiding device (1) and the stationary part (4) are joined by an assembly means (51) which comprises:

a) a rotating shaft (52) having a longitudinal axis (3) and a predetermined diameter (D1), comprising two ends (52B, 52C), end (52B) being integral with either the stationary part (4) or one of the parts (7A, 50) of the device (1), wherein said device (1) is rotationally fixed about the rotational axis (3), the other end being free and carrying a rotating cylindrical pin (53) of predetermined diameter (D2), at least one section of which (53A) projects radially from the surface of the shaft (52) at a predetermined distance (E1) from the end (52C), b) a supporting piece (54) which, being connected to a structure (55) relative to which the movable part (2) must be rotationally index guided, comprises:

i) a front face 54A, a bore (54B) opening into said front face (54A), said bore (54B) having a longitudinal axis (3) approximately orthogonal to said front face (54A) and a diameter (D3) greater than diameter (D1) of the shaft (52), ii) a dorsal face (54E) disposed opposite to the front face (54A), said dorsal face (54E) bordering the bore (54B) and located a predetermined distance (E2) from the front face (54A), c) a shouldered part (56) comprising:

i) a shaft (56A) having a diameter (D4), capable of being inserted so as to slide in the bore (54B) of the supporting piece (54), ii) a dorsal face (56B) of said shouldered part (56) intended to come to rest against the front face (54A) of the supporting piece (54) when the shaft (52) is inserted into the bore (54B) of supporting piece (54), iii) cut into the shaft (56A), a bore (56C) having a diameter (D5), capable of receiving sliding free end (52C) of the shaft (52) carrying the pin (53), iv) a front face (56D) which extends in a plane approximately orthogonal to the longitudinal axis (3) of the bore (56C), v) at least one groove (56E) opening into the front face (56D) and extending radially to the bore (56C) and having a cross-section and dimensions such that said groove (56E) allows a section (53A) of the pin (53) to be laterally inserted and then elastically held in position, and vi) at least one stop (56G) carried radially by the shaft (56A) in an elastic way and cooperating at least locally with the dorsal face (54D) of the supporting piece (54) after the shaft (56A) has been inserted far enough into the bore (54B) of said supporting piece (54) for the front face (54A) of the supporting piece (54) to support the dorsal face (56B) of the shouldered part (56).

14. A device according to claim 12, the index guiding device and the stationary part (4) are joined by an assembly means (51) which comprises:

a) a first rotating shaft (52) comprising an axial bore (52A) of predetermined diameter (D1) and two ends (52B, 52C), one of which ends (52B) is free, the other end (52C), firstly, being integral with either the stationary part (4) or one of the parts (7A, 50) of the device (1), which must be rotationally fixed about the rotational axis (3), and secondly, carrying a rotating cylindrical pin (53) of predetermined diameter (D2), which extends radially into the bore (52A) at a predetermined distance from the terminal face of the end (52C), and b) a second rotating shaft (54) having a diameter (D3), capable of being inserted so as to slide in the bore (52A) of the first shaft (52) and comprising two ends (54A, 54B), one of which ends (54A) is integral with the part opposing the one with which the bored shaft (52) is integral, while the other end (54B) houses, in a rotating cylindrical housing (54C), an insert (54D) made of elastic material which, being translationally and rotationally fixed, has a terminal face (54E) substantially in the plane of the terminal face (54F) of end (54B), said end (54B) including:

i) an opening into each of the terminal faces (54E, 54F) of the second shaft (54) and of the insert (54D), a longitudinal groove (54G, 54H) which, in the second shaft (54), has a width and a depth such that it allows the lateral insertion of the pin (53) substantially at the end point of the longitudinal insertion of the first shaft (52) into the bore (52A), and which, in the insert (54D) has a cross-section such that said longitudinal groove (54G, 54H) allows the lateral insertion and the elastic retraction of the pin (53).

15. The device according to claim 14, intended to equip an arm rest of at least one seat of a vehicle which, being movable along a trajectory and in a predetermined direction, can be subjected to at least one deceleration of equally predetermined value, said device comprising a means (M) for detecting the deceleration of predetermined value and for locking the second ratchet (6) into a fully engaged position against at least one ramp (7, 71).

16. The device according to claim 15, the means (M) for detecting the deceleration of predetermined value and for locking the second ratchet (6) into a fully engaged position against a ramp (7, 71) comprises:

a) a stop (M1) integral with the second ratchet (6) disposed and oriented so as to receive, in the engaged position of the second ratchet (6) against the ramp (7, 71), an action for holding the second ratchet (6) in the engaged position, b) a ball (M2) of predetermined mass, c) a means (M3) for guiding the ball (M2) along a trajectory substantially parallel to that of the movement of the vehicle, between two positions, one of which is a stand-by position in which the ball (M2) is spaced apart from the stop (M1) for locking the-second ratchet (6), and an active position in which it is placed against said locking stop (M1), and d) a means (M4) for maintaining the ball (M2) in the stand-by position until ball (M2) is subjected to a deceleration reflecting the deceleration beyond which the second ratchet (6) must be held in the engaged position against the ramp (7, 71).

* * * * *